United States Patent
Deng et al.

(10) Patent No.: US 8,553,783 B2
(45) Date of Patent: Oct. 8, 2013

(54) APPARATUS AND METHOD OF MOTION DETECTION FOR TEMPORAL MOSQUITO NOISE REDUCTION IN VIDEO SEQUENCES

(75) Inventors: Xiaoyun Deng, Singapore (SG); Patricia Chiang, Singapore (SG)

(73) Assignee: STMicroelectronics Asia Pacific PTE Ltd., Singapore (SG)

( * ) Notice: Subject to any disclaimer, the term of this patent is extended or adjusted under 35 U.S.C. 154(b) by 895 days.

(21) Appl. No.: 12/494,124

(22) Filed: Jun. 29, 2009

(65) Prior Publication Data

US 2010/0165207 A1 Jul. 1, 2010

Related U.S. Application Data

(60) Provisional application No. 61/141,188, filed on Dec. 29, 2008.

(51) Int. Cl.
*H04N 11/02* (2006.01)

(52) U.S. Cl.
USPC .......... 375/240.27; 375/240.29; 382/254; 382/261; 382/275; 348/606; 348/607; 348/620; 348/699; 348/701

(58) Field of Classification Search
USPC .......... 375/240; 382/254–275; 348/606–701
See application file for complete search history.

(56) References Cited

U.S. PATENT DOCUMENTS

| | | | | |
|---|---|---|---|---|
| 6,061,100 A | * | 5/2000 | Ward et al. | 348/607 |
| 7,327,405 B1 | * | 2/2008 | Lowe et al. | 348/663 |
| 7,680,355 B2 | * | 3/2010 | Chiu et al. | 382/266 |
| 2005/0248687 A1 | * | 11/2005 | Lee et al. | 348/606 |
| 2006/0158550 A1 | | 7/2006 | Zhou et al. | |
| 2008/0273119 A1 | * | 11/2008 | Yang et al. | 348/575 |
| 2008/0309823 A1 | * | 12/2008 | Hahn et al. | 348/606 |
| 2009/0323808 A1 | * | 12/2009 | Lin | 375/240.16 |

FOREIGN PATENT DOCUMENTS

WO 2006010276 A1 2/2006

OTHER PUBLICATIONS

Delcorso, S. et al., "MNR: A Novel Approach to Correct MPEG Temporal Distortions," IEEE Transactions on Consumer Electronics, Feb. 2003, p. 229-236, vol. 49, No. 1.

Hensel, M. et al., "Motion and noise detection for adaptive spatio-temporal filtering of medical X-ray image sequences", Proceedings MIUA, Jul. 2005, p. 219-222, Bristol, United Kingdom.

Skoneczny, S., "Image processing for old movies by filters with motion detection", International Journal of Applied Mathematics and Computer Science, 2005, p. 481-491, vol. 15, No. 4.

* cited by examiner

*Primary Examiner* — William C Vaughn, Jr.
*Assistant Examiner* — Luis M Perez
(74) *Attorney, Agent, or Firm* — Seed IP Law Group PLLC

(57) ABSTRACT

Apparatus and methods of motion detection for mosquito noise reduction in video sequences are provided. In one aspect, a method of motion detection in a sequence of digital images classifies a pixel of a plurality of pixels of a current image frame represented by a digital video input signal as a motion or non-motion pixel. A motion value for the pixel is calculated based on the classification of the pixel. The motion value is mapped to a coefficient of a temporal filter based on a control curve. A digital video output signal is generated based on the coefficient.

19 Claims, 21 Drawing Sheets

APPARATUS AND METHOD OF MOTION DETECTION FOR TEMPORAL MOSQUITO NOISE REDUCTION IN VIDEO SEQUENCES

CROSS-REFERENCE TO RELATED APPLICATION

This application claims the benefit under 35 U.S.C. §119 (e) of U.S. Provisional Patent Application Ser. No. 61/141, 188, filed Dec. 29, 2008, entitled "Apparatus and Methods of Motion Detection for Temporal Mosquito Noise Reduction in Video Sequences," which is incorporated herein by reference in its entirety.

BACKGROUND

1. Technical Field

This disclosure generally relates to the field of motion detection techniques in video sequences and, more particularly, to motion detection for temporal mosquito noise reduction.

2. Description of the Related Art

In digital imaging, mosquito noise is one of the commonly seen coding artifacts mainly in smoothly textured regions around high contrast edges as temporal fluctuations of luminance and chrominance levels. It is a form of edge busyness resembling a mosquito flying around a subject. Conventional spatial noise reduction systems could partially reduce mosquito noise, but blurring effect may also be generated as a side effect. Moreover, conventional spatial noise reduction systems also lack of the capability of reducing temporal fluctuation.

Random noise, as another form of noise, exists in captured and transmitted video. It is called random noise as this kind of noise is typically distributed over the images randomly and tends to make the images slightly soft and blurry. On close inspection, one may see tiny specks all over the images as a result of random noise. Random noise may be corrected by a temporal noise reduction system in addition to the spatial noise reduction system for preserving maximum details on stationary scene.

A temporal noise reduction system is a system that performs noise reduction by using information of a pixel at the same coordinates in two consecutive frames. If an image is stationary, the temporal noise reduction system typically shows an excellent noise removal effect. If, however, the image is moving, the temporal noise reduction system tends to deteriorate image quality, resulting in tail artifact or blurring effect. Thus, the strength of the temporal noise reduction system should be accurately controlled, or adjusted, by a motion detection system which indicates the true motion value of a pixel. In noisy images, more sophisticated approach is needed to distinguish between the noise and the true motion, such that the noise may be effectively reduced by the noise reduction system while the details of the images are preserved and no tail artifact is introduced. For efficient mosquito noise reduction, the design challenge of a robust motion detector is the successful handling of strong mosquito noise, especially at areas near strong edges. Such noise might be falsely detected as motion by conventional motion detectors due to its high magnitude, sometimes even higher than that of the true motion pixels.

To date, there have been a number of efforts on motion detection or classification in the context of temporal noise reduction.

For instance, in U.S. Patent Application Publication No. US2006/0158550 A1 filed by Zhou et al., a motion detector for the application of de-interlacing is proposed. This motion detector first thresholds the low-pass filtered frame difference of a pixel. If the pixel or one of its two adjacent pixels delayed by one field has the frame difference larger than the threshold, then the pixel is detected as a motion pixel. The binary decision is then low-pass filtered to give the coefficient for controlling the switch between the temporal and spatial filter. However, this coefficient does not reflect the motion difference value. If there is a region of high motion difference while there is another of low motion difference but classified as motion, both regions will be calculated to have the same coefficient; and thus the same amount of temporal and spatial filtering will be applied. Moreover, the low-pass filter before the pixel classification might destroy the high-frequency edges and details in the difference image and thus make the pixels being misclassified and blurred by the temporal processing.

In S. Skoneczny, "Image processing for old movies by filters with motion detection", International Journal of Applied Mathematics and Computer Science, vol. 15, No. 4, pp. 481-491, 2005, the author proposed a motion/non-motion pixel classification method by thresholding both the forward and backward differences. If two adjacent pixels have both their forward and backward differences above the respective threshold, the center pixel is classified as a motion pixel. This motion classification system, however, requires processing of three frames, which may involve expensive computation and implementation.

In M. Hensel et al., "Motion and noise detection for adaptive spatio-temporal filtering of medical X-ray image sequences", Proceedings MIUA, July 2005, the authors proposed a motion and noise detection method for controlling the strength of the spatial and temporal filters to reduce noise, and specifically system noise. The motion and noise differentiation is achieved by morphologically processing the positive and negative pixel values of different images independently. The independent processing of positive and negative pixel difference improves the motion and noise detection. However, the morphological operation requires expensive computation like opening and closing, and thus is not suitable for real-time video processing but off-line image processing.

In S. Delcorso et al., "MNR: A novel approach to correct MPEG temporal distortions", IEEE Transactions on Consumer Electronics, vol. 49, Issue 1, pp. 229-236, February 2003, a binary motion/non-motion pixel classification by thresholding the low-pass filtered difference image is proposed. Although the low-pass filter is expected to improve the noise robustness of the classification to some extent, it is nevertheless at the risk of destroying the edges or details in the difference image, and thus might result in incorrect classification and blurring.

In International Patent Application Publication No. WO 2006/010276 A1 filed by Dinh et al., a comprehensive 3D post processing method and system is proposed for mosquito noise reduction. The system includes a block localizer, a noise power estimator, a blocking artifact reducer, a spatial noise reducer, a temporal noise reducer, and a detail enhancer. The temporal noise reducer includes a motion detector for minimizing motion blur artifact. The motion detector is adaptive to noise by subtracting the estimated spatial noise variance from the time difference to represent motion. The motion is compared to a threshold value related to the noise variance at the current pixel and a 3×3 window for hard and soft no-motion decision. The motion, the noise variance, and the no-motion decision together yield a final filter coefficient to be sent to the temporal filter. This motion detector, however, is not fully automatic because it requires a noise power estimator which depends on the user correction level. In addition, it requires expensive computation like image segmentation for noise power estimation, in which edge detection is performed for image segmentation. Nonetheless, only strong edges are detected due to a low pass filter before the detection. As a result, blurring effect may be found on soft edges.

Most of the prior art attempted to improve the robustness of the motion detector against noise, but often at the cost of sacrificing small edges and details. Most of the prior art suffer from the absence of edge/texture analysis and protection and, thus, may result in blurring while reducing noise. Although prior art WO 2006/010276 A1 has additional consideration for mosquito noise, it requires user correction and expensive computation such as segmentation for motion detection.

BRIEF SUMMARY

A method of motion detection in a sequence of digital images may be summarized as including: classifying a pixel of a plurality of pixels of a current image frame represented by a digital video input signal as a motion or non-motion pixel; calculating a motion value for the pixel based on the classification of the pixel; mapping the motion value to a coefficient of a temporal filter based on a control curve; and generating a digital video output signal based on the coefficient. In one embodiment, the motion value for the pixel may be calculated by using an absolute pixel difference value and a suppressed motion value based on respective luminance and chrominance components of a filtered previous frame and the current frame. Calculating a motion value for the pixel based on the classification of the pixel may include selecting an absolute pixel difference for motion classified pixel; and selecting a suppressed motion value for a non-motion classified pixel.

In one embodiment, classifying a pixel of a plurality of pixels of a current frame to be a motion or non-motion pixel may include performing thresholding and spatial connectivity checking for the pixel of the plurality of pixels of the image. Performing thresholding may include performing signed or unsigned thresholding using an edge and texture adaptive threshold provided by an adaptive threshold calculator. Performing signed or unsigned thresholding using an edge and texture adaptive threshold provided by an adaptive threshold calculator may include performing signed or unsigned thresholding using analyzed edge and texture statistics information in a block of surrounding pixels or a coded discrete cosine transform (DCT) block of pixels.

In an alternative embodiment, performing thresholding may include calculating a signed or unsigned pixel difference value between a filtered previous frame and the current frame; and comparing the signed or unsigned pixel difference value against a respective signed or unsigned motion threshold. In addition, performing thresholding using an edge and texture adaptive threshold provided by an adaptive threshold calculator may include analyzing edge and texture statistics information in a block of surrounding pixels or a DCT block of pixels, calculating a relative edge value of a pixel, the relative edge being a detected edge gradient normalized by a maximum edge gradient over the block of surrounding pixels; and mapping the relative edge value of the pixel to a motion threshold according to a mapping curve. Furthermore, mapping the relative edge value of the pixel to a motion threshold according to a mapping curve may include setting motion threshold values to be high for pixels with low relative edge values; setting the motion threshold values to be low for pixels with high relative edge values; adjusting the motion threshold values for flat area pixels or texture area pixels having low relative edge values based on a strength of a dominant edge and an average texture level in the block of surrounding pixels; and adjusting the motion threshold values for dominant edge pixels based on an estimated picture noise level.

In yet another alternative embodiment, performing spatial connectivity checking for the pixel of the plurality of pixels of the image may include counting a number of pixels in adjacent two rows and adjacent two columns each as having a respective absolute value of a respective positive, negative or absolute pixel difference exceeding a positive, negative or absolute motion threshold, respectively; and comparing the number of count to a predetermined count threshold to check the connectivity to determine if the pixel is a motion or non-motion pixel.

An apparatus for temporal mosquito noise reduction in digital imaging may be summarized as including a motion detector, a temporal filter, and a frame delay unit. The motion detector may be coupled to receive a first video input signal and a second video input signal, the motion detector configured to classify a pixel of a plurality of pixels of a current frame of an image as a motion or non-motion pixel based on the received first and second video input signals, calculate a motion value for the pixel based on the classification of the pixel, and generate a coefficient. The temporal filter may be coupled to receive the coefficient from the motion detector to generate a video output signal. The frame delay unit may be coupled to receive the video output signal from the temporal filter to delay the video output signal and generate the second video input signal.

In one embodiment, the motion detector may include an edge and texture analyzer, an adaptive threshold calculator, a pixel difference calculator, a motion classifier, a noise cancellation filter, a motion value calculator, and a control curve mapping unit. The edge and texture analyzer may be coupled to receive the first video signal and the second video signal to output a gradient magnitude of a current pixel, a maximum gradient magnitude of a block of surrounding pixels or a DCT block of pixels, and an average gradient magnitude of the block of surrounding pixels or the DCT block of pixels. The adaptive threshold calculator may be coupled to receive the gradient magnitude of the current pixel, the maximum gradient magnitude of the block of surrounding pixels or the DCT block of pixels, and the average gradient magnitude of the block of surrounding pixels or the DCT block of pixels to output a pixel-based motion threshold. The pixel difference calculator may be coupled to receive the first and second video signals to output a difference of the first and second video signals. The motion classifier may be coupled to receive the pixel-based motion threshold and the difference of the first and second video signals to output a pixel-based motion classification value. The noise cancellation filter may be coupled to receive the first and second video signals to output a suppressed motion value. The motion value calculator may be coupled to receive the difference of the first and second video signals, the pixel-based motion classification value, and the suppressed motion value to output a motion value of the pixel. The control curve mapping unit may be coupled to receive the motion value of the pixel to output the coefficient to the temporal filter.

In one embodiment, the edge and texture analyzer may include a first edge detector, a second edge detector, a maximum operator, a block memory buffer, a maximum edge detector, and an average gradient calculator. The first edge detector may be coupled to receive a luminance component of the first video signal to output a pixel gradient magnitude of a current frame. The second edge detector may be coupled to receive a luminance component of the second video signal to output a pixel gradient magnitude of a filtered previous frame. The maximum operator may be coupled to receive the pixel gradient magnitude of the current frame and the pixel gradient magnitude of the filtered previous frame to output the gradient magnitude of the current pixel representative of the greater of the current frame and the pixel gradient magnitude of the filtered previous frame. The block memory buffer may be coupled to receive the gradient value to store and output pixel gradients of the block of surrounding pixels or the DCT block of pixels. The maximum edge detector may be coupled to receive the pixel gradients of the block of surrounding pixels or the DCT block of pixels to output the maximum gradient magnitude of the block of surrounding pixels or the DCT block of pixels. The average gradient calculator may be coupled to receive the pixel gradients of the block of surrounding pixels or the DCT block of pixels to output the average gradient magnitude of the block of surrounding pixels or the DCT block of pixels.

In one embodiment, the adaptive threshold calculator may include an adaptive threshold curve calculator coupled to receive a picture motion threshold and a relative gradient threshold to output the pixel-based motion threshold. The adaptive threshold calculator may further include a relative gradient calculator coupled to receive the gradient magnitude of the current pixel and the maximum gradient magnitude of the block or surrounding pixels or the DCT block of pixels to output a relative gradient related to a ratio of the gradient magnitude of the current pixel and the maximum gradient magnitude of the block or surrounding pixels or the DCT block of pixels. The adaptive threshold curve calculator may further receive the average gradient magnitude of the block or surrounding pixels or the DCT block of pixels, the relative gradient, and a rising factor of the motion threshold in addition to the picture motion threshold and the relative gradient threshold to output the pixel-based motion threshold.

In one embodiment, the pixel difference calculator may include a first subtractor, a second subtractor, a third subtractor, a first absolute operator, a second absolute operator, a third absolute operator, and a comparison unit. The first subtractor may be coupled to receive and subtract a luminance component of the first video signal and a luminance component of the second video signal to output a first signed difference value. The second subtractor may be coupled to receive and subtract a chrominance U component of the first video signal and a chrominance U component of the second video signal to output a second signed difference value. The third subtractor may be coupled to receive and subtract a chrominance V component of the first video signal and a chrominance V component of the second video signal to output a third signed difference value. The first absolute operator may be coupled to receive the first signed difference value to provide a first absolute difference value. The second absolute operator may be coupled to receive the second signed difference value to provide a second absolute difference value. The third absolute operator may be coupled to receive the third signed difference value to provide a third absolute difference value. The comparison unit may be coupled to receive at least the first, second, and third signed difference values to output the difference of the first and second video signals. In an alternative embodiment, the pixel difference calculator may further include a first low pass filter, a second low pass filter, and a third low pass filter. The first low pass filter may be coupled to receive the first absolute difference value in a window to provide a first filtered difference value of a center pixel. The second low pass filter may be coupled to receive the second absolute difference value in the window to provide a second filtered difference value of the center pixel. The third low pass filter may be coupled to receive the third absolute difference value in the window to provide a third filtered difference value of the center pixel. The comparator unit may include a comparator and a switch. The comparator may be coupled to receive at least the first, second, and third filtered difference values to output a selection decision. The switch may be coupled to receive at least the first, second, and third signed difference values and the selection decision to output the difference of the first and second video signals.

In one embodiment, the noise cancellation filter may include a first subtractor, a second subtractor, a third subtractor, a first low pass filter, a second low pass filter, a third low pass filter, a first absolute operator, a second absolute operator, a third absolute operator, and a comparison unit. The first subtractor may be coupled to receive and subtract a luminance component of the second video signal from a luminance component of the first video signal to output a first signed difference value. The second subtractor may be coupled to receive and subtract a chrominance U component of the second video signal from a chrominance U component of the first video signal to output a second signed difference value. The third subtractor may be coupled to receive and subtract a chrominance V component of the second video signal from a chrominance V component of the first video signal to output a third signed difference value. The first low pass filter may be coupled to receive and filter the first signed difference values in a window to output a first signed suppressed difference value of a center pixel. The second low pass filter may be coupled to receive and filter the second signed difference values in a window to output a second signed suppressed difference value of the center pixel. The third low pass filter may be coupled to receive and filter the third signed difference values in a window to output a third signed suppressed difference value of the center pixel. The first absolute operator may be coupled to receive the first signed suppressed difference value to provide a first absolute suppressed difference value. The second absolute operator may be coupled to receive the second signed suppressed difference value to provide a second absolute suppressed difference value. The third absolute operator may be coupled to receive the third signed suppressed difference value to provide a third absolute suppressed difference value. The comparison unit may be coupled to receive and compare at least the first, second, and third absolute suppressed difference values to output one of the received first, second, and third absolute suppressed difference values having a maximum magnitude as a suppressed difference of the first and second video signals.

In one embodiment, the motion value calculator may include an absolute operator and a switch. The absolute operator may be coupled to receive difference of the first and second video signals to output an absolute value of the difference of the first and second video signals. The switch may be coupled to receive a motion classification decision, the suppressed motion value and a value related to the absolute value of the difference of the first and second video signals to output a value related to the motion value of the pixel based on the motion classification decision. The motion value calculator may further include a motion value enhancer and a low pass filter. The motion value enhancer may be coupled to receive an absolute value of a difference of the first and second video signals to output an enhanced difference value of the first and second video signals. The low pass filter may be coupled to receive a motion value of the pixel based on the motion classification decision to output a post-processed value related to the motion value of the pixel.

A digital image noise reduction device may be summarized as including a filter unit and a frame delay unit. The filter unit may receive a video input signal and a delayed video signal to output a filtered video output signal. The filter unit may include a motion detector and temporal filter unit, and a spatial filter unit coupled to the motion detector and temporal filter unit. The frame delay unit may receive the filtered video output signal to output the delayed video signal. In one embodiment, the filter unit may further include a noise level estimator and a fader. The noise level estimator may be coupled to receive the video input signal to output a picture noise level to the motion detector and temporal filter unit. The fader may be coupled to receive outputs of the motion detector and temporal filter unit and the spatial filter unit to output the filtered video output signal.

Another digital image noise reduction device may be summarized as including a first temporal filter unit and a second temporal filter unit. The first temporal filter unit may receive a signal related to a video input signal to output a first temporally filtered signal. The first temporal filter unit may include a first frame delay unit coupled to receive the signal related to the video input signal to output a delayed video input signal and a first motion detector and temporal filter unit coupled to receive the video input signal and the delayed video input signal to output the first temporally filtered signal. The second temporal filter unit may receive a signal related to the first temporally filtered signal to output a second temporally filtered signal. The second temporal filter unit may include a second frame delay unit coupled to receive a video output signal to output a delayed video output signal. The second temporal filter unit may further include a second motion detector and temporal filter unit coupled to receive the delayed video output signal and the signal related to the first temporally filtered signal to output the second temporally filtered signal.

DETAILED DESCRIPTION

Figure 1:
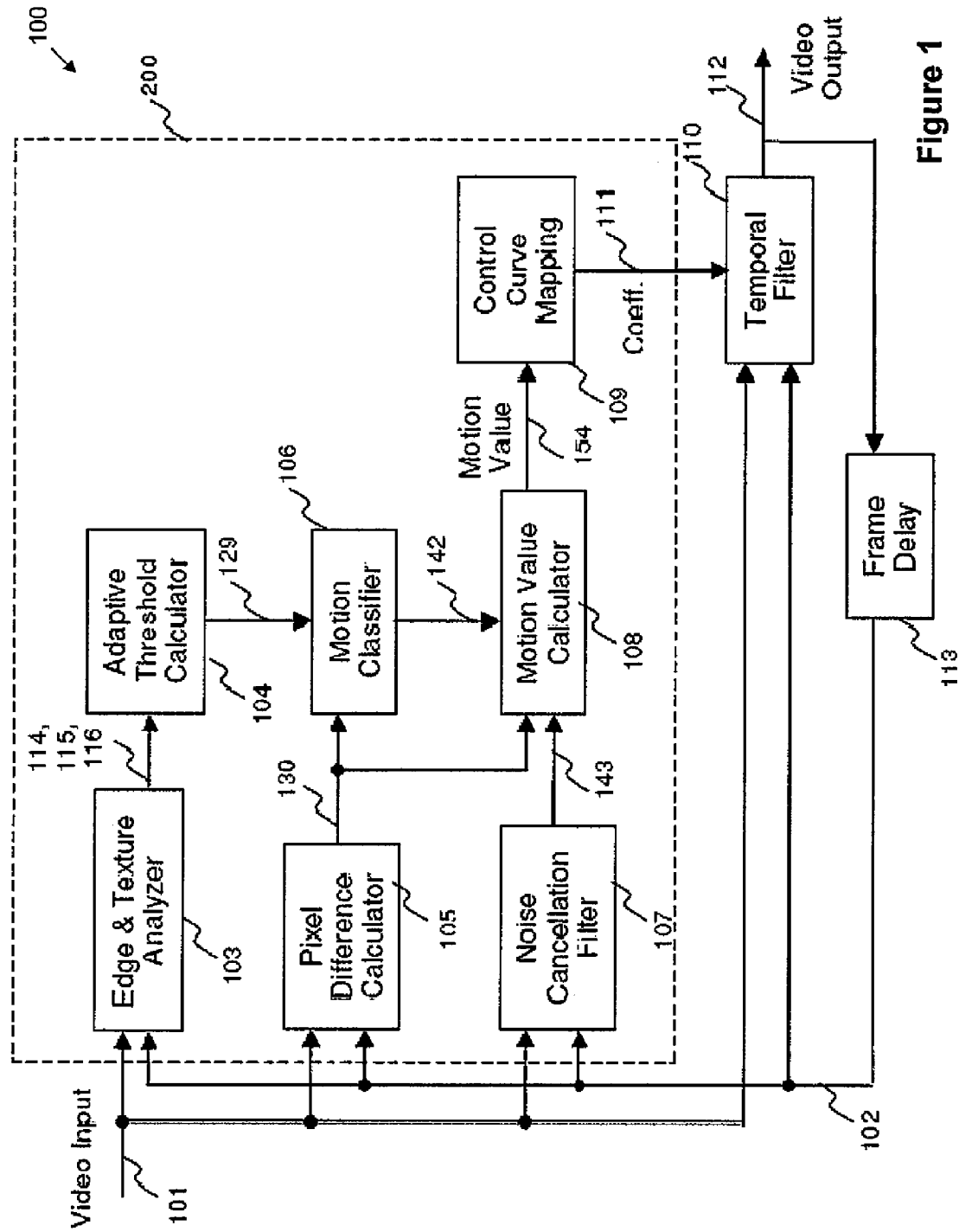
FIG. 1 is a block diagram of a motion detection and temporal filtering apparatus according to one embodiment.

FIG. 1 illustrates a motion detection and temporal filtering apparatus 100 according to one embodiment.

The apparatus 100 receives a first video input signal 101. The first video input signal 101 is a video signal having a luminance Y component and chrominance UN components. The apparatus 100 includes a motion detector 200, a temporal filter 110 that outputs a video output signal 112, and a frame delay 113. Both the motion detector 200 and the temporal filter 110 receives the video input signal 101 and a second video input signal 102. The second video input signal 102 is the filtered video output signal of the apparatus 100 with one frame delay by the frame delay 113. Accordingly, the second video input signal 102 also includes respective luminance Y and chrominance UN components. The first video input signal 101 and the second video input signal 102 are representative of the current frame and the filtered previous frame, respectively. The motion detector 200 includes an edge and texture analyzer 103, an adaptive threshold calculator 104, a pixel difference calculator 105, a motion classifier 106, a noise cancellation filter 107, a motion value calculator 108, a control curve mapping unit 109. In one embodiment, the motion detector 200 is implemented in integrated circuits, for example, in a microprocessor or a special-purpose processor such as a video image or graphics processor. Alternatively, only a portion of the detector 200 is implemented in integrated circuits.

The edge and texture analyzer 103, as will be described in detail below with reference to FIG. 2, receives the luminance component of the first and second video input signals 101 and 102 and outputs to the adaptive threshold calculator 104 edge and texture statistics information. The edge and texture statistics information includes the gradient magnitude of the current pixel 114, the max gradient magnitude in the pixels of a block of surrounding pixels or a discrete cosine transform (DCT) block 115, and the average gradient magnitude in the block of surrounding pixels or in the pixels of the DCT block 116. Discrete cosine transform is often used in lossy video compression, such as MPEG1 and MPEG2. A DCT block herein refers to a block of pixels in a frame of a video sequence going through discrete cosine transform and quantizing in the encoding process, and is inversely transformed and reproduced by a decoder.

The adaptive threshold calculator 104, as will be described in detail below with reference to FIG. 4, receives the edge and texture statistics information provided by the edge and texture analyzer 103 and outputs a pixel-based motion threshold 129 to the motion classifier 106.

The pixel difference calculator 105, as will be described in detail below with reference to FIG. 6, receives the first and second video input signals 101 and 102 and outputs a pixel difference 130 of the first and second video input signals 101, 102 representative of a motion value. The pixel difference 130 is provided to both the motion classifier 106 and the motion value calculator 108.

The motion classifier 106, as will be described in detail below with reference to FIG. 7, receives the pixel difference 130 of the first and second video input signals 101, 102 from the pixel difference calculator 105 and the adaptive motion threshold 129 from the adaptive threshold calculator 104. The motion classifier 106 outputs a pixel-based motion classification decision 142 to indicate whether or not the pixel is a motion or non-motion pixel.

The noise cancellation filter 107, as will be described in detail below with reference to FIG. 8, receives the first and second video input signals 101 and 102 and outputs a suppressed motion value 143.

The motion value calculator 108, as will be described in detail below with reference to FIGS. 9A and 9B, receives the pixel difference 130 from the pixel difference calculator 105 and the suppressed motion value 143 from the noise cancellation filter 107 and outputs a final motion value of the pixel 154 to the control curve mapping unit 109 to decide a coefficient of the temporal filter 110.

The control curve mapping unit 109 receives the final motion value of the pixel 154 and maps it in a derived and tuned look-up table to output a coefficient 111, which is the coefficient for the temporal filter 110. The control curve is derived and tuned for the prevention of tail and blurring artifacts. The control curve mapping unit 109 is tuned so that it maps the motion value 154 to the temporal filter coefficient 111 for the temporal filter 110. The output of the temporal filter 110, the video output signal 112, is stored by the frame delay 113 and used for motion detection of the next frame. In one embodiment, the frame delay 113 delays the video output signal 112 to output the second video input signal 102 to the edge and texture analyzer 103, the pixel difference calculator 105, and the noise cancellation filter 107.

The temporal filter 110 interpolates the first and second video input signals 101 and 102 according to the following equation:

$$Y'_n = (1-k) \times Y_n + k \times Y'_{n-1} = Y_n - k \times (Y_n - Y'_{n-1}), \text{ where}$$

$Y_n$ is the luminance Y component of the first video input signal 101, $Y'_{n-1}$ is the luminance Y component of the second video input signal 102, $Y'_n$ is the luminance component of the video output signal 112, and k is the filtering coefficient in the range of [0, 1].

Similar equations apply to the chrominance U/V components of the first and second video input signals 101, 102 and the video output signal 112.

Figure 2:
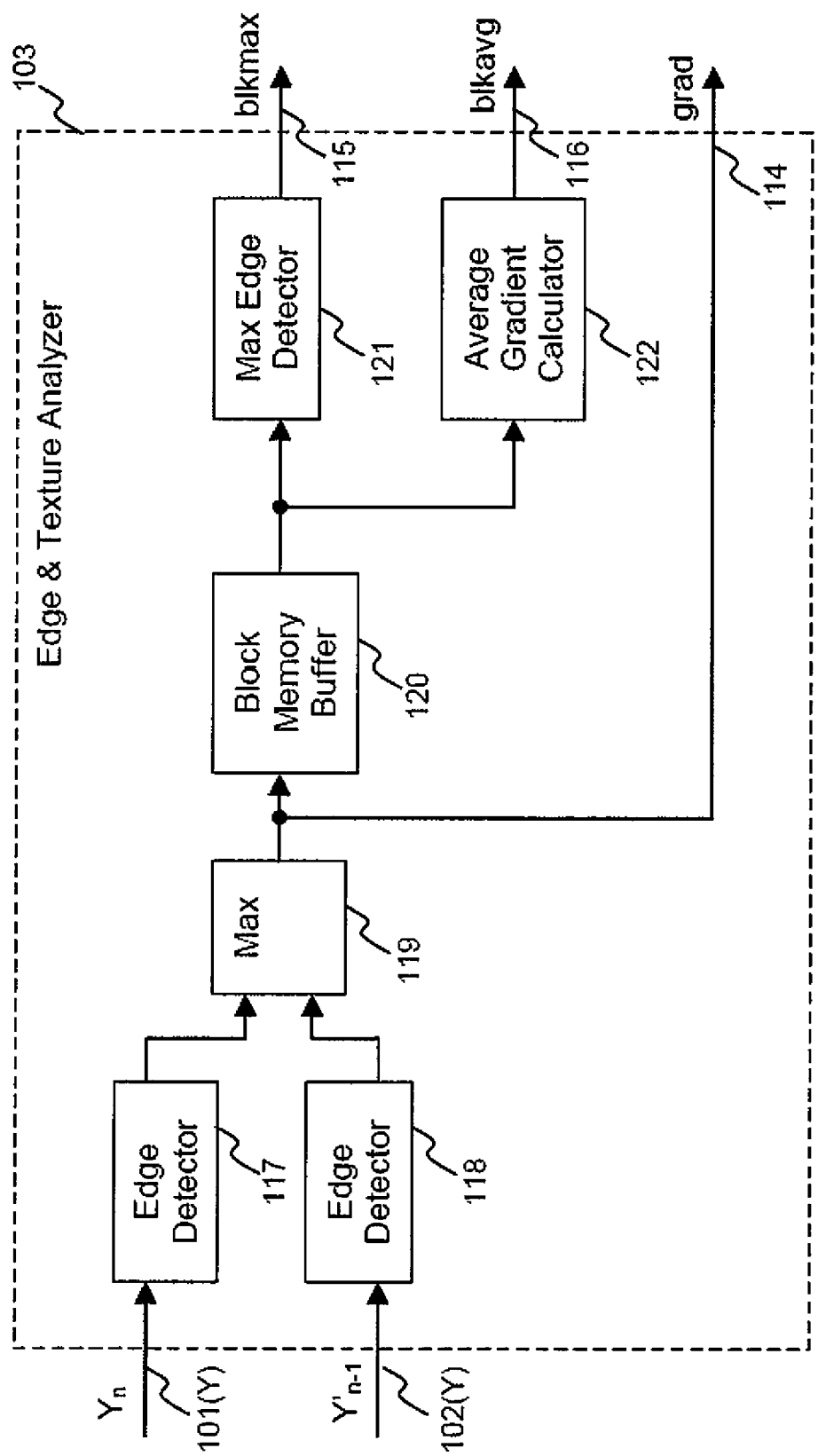
FIG. 2 is a block diagram of an edge and texture analyzer of the apparatus of FIG. 1 according to one embodiment.

FIG. 2 illustrates an edge and texture analyzer of the motion detector 200 of FIG. 1 according to one embodiment.

In one embodiment, the edge and texture analysis unit 103 requires only the luminance Y component of each of the first and second video input signals 101, 102. Alternatively, the luminance Y component and the chrominance U/V components of the first and second video input signals 101, 102 are provided to and used by the edge and texture analysis unit 103. In one embodiment, the edge and texture analysis unit 103 includes two edge detectors 117 and 118, a maximum operator 119, a block memory buffer 120, a maximum edge detector 121, and an average edge detector 122.

In an embodiment, the edge detector 117 receives the luminance Y component of the first video input signal 101 and outputs a pixel gradient magnitude of a current frame. The edge detector 118 receives the luminance Y component of the second video input signal 102 and outputs a pixel gradient magnitude of a filtered previous frame. The maximum operator 119 receives the pixel gradient magnitude of the current frame and the pixel gradient magnitude of the filtered previous frame and, in turn, outputs the gradient magnitude of the current pixel representative of the greater of the current frame and the pixel gradient magnitude of the filtered previous frame. The block memory buffer 120 receives the gradient value to store and output pixel gradients of the block of surrounding pixels or the DCT block of pixels. The maximum edge detector 121 receives the pixel gradients of the block of surrounding pixels or the DCT block of pixels and outputs the maximum gradient magnitude of the block of surrounding pixels or the DCT block of pixels. The average gradient calculator 122 receives the pixel gradients of the block of surrounding pixels or the DCT block of pixels and outputs the average gradient magnitude of the block of surrounding pixels or the DCT block of pixels.

Figure 3:
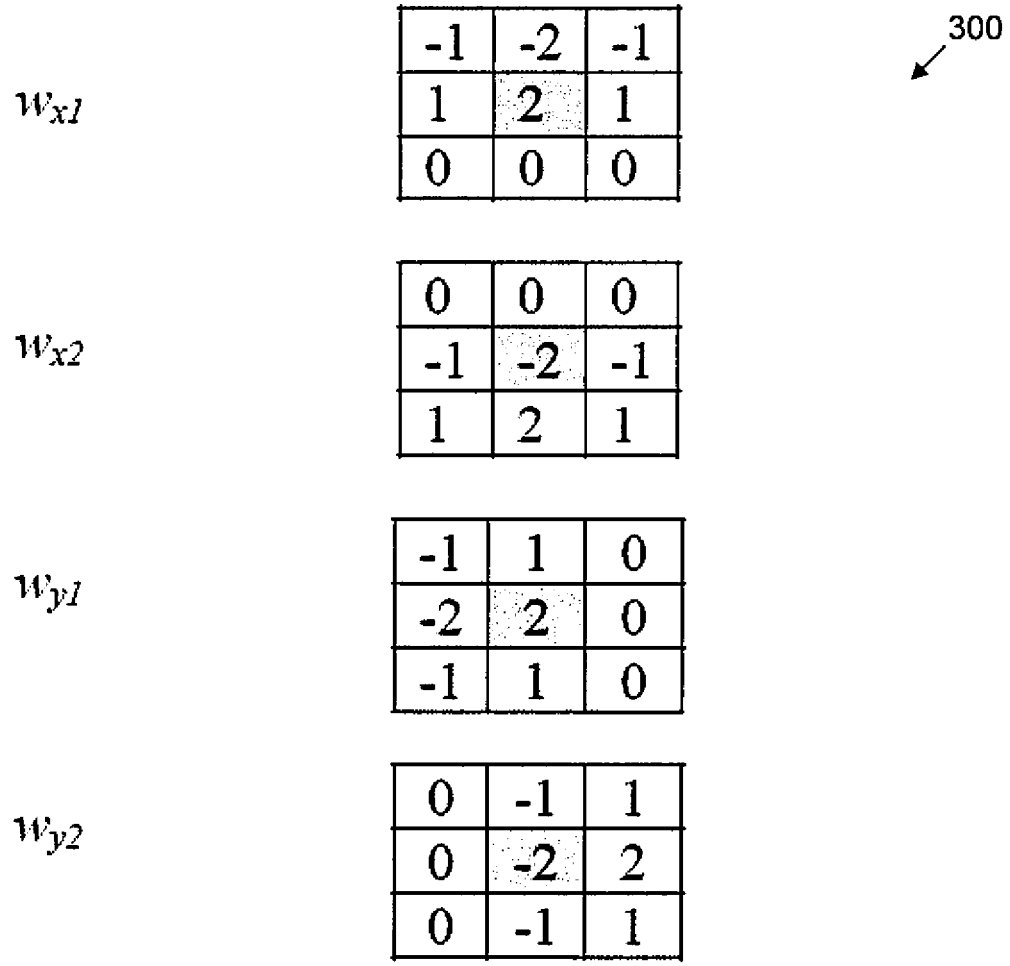
FIG. 3 is a diagram of four revised Sobel operators according to one embodiment.

FIG. 3 illustrates a diagram of four revised Sobel operators according to one embodiment.

In one embodiment, each of the edge detectors 117, 118 includes four parallel revised Sobel operators shown in FIG. 3. A sum of the absolute values of four gradient magnitudes are calculated and divided by 4 as shown below.

$$\text{horizontal gradient 1,} \quad gradx1 = \sum_i^9 w_{x1} \cdot Y[i];$$

$$\text{horizontal gradient 2,} \quad gradx2 = \sum_i^9 w_{x2} \cdot Y[i];$$

$$\text{vertical gradient 1,} \quad grady1 = \sum_i^9 w_{y1} \cdot Y[i];$$

$$\text{vertical gradient 2,} \quad grady2 = \sum_i^9 w_{y2} \cdot Y[i];$$

resultant gradient of the center pixel, $$grad = \frac{|gradx1| + |gradx2| + |grady1| + |grady2|}{4}$$

where gradx1 and gradx2 represent the two horizontal gradients, grady1 and grady2 represent the two vertical gradients, $w_{x1}$ and $w_{x2}$ represent the two horizontal Sobel masks as shown in FIG. 3, $w_{y1}$ and $w_{y2}$ represent the two vertical Sobel masks as shown in FIG. 3, Y[i] represents the luminance value of the pixel i in a 3×3 window, and grad represents the resultant pixel gradient magnitude.

In FIG. 2, the edge detector 117 provides the pixel gradient magnitude of the current frame, while the edge detector 118 provides the pixel gradient magnitude of the filtered previous frame. The maximum of the two gradient magnitudes are then obtained by the maximum operator 119 to represent the gradient magnitude of a pixel 114. Those skilled in the art will appreciate that both edge detectors 117, 118 are necessary as the motion detection should be robust against mosquito noise in both input frames and should prevent edges and texture from blurring by the interpolation between two input frames.

Figure 4A:
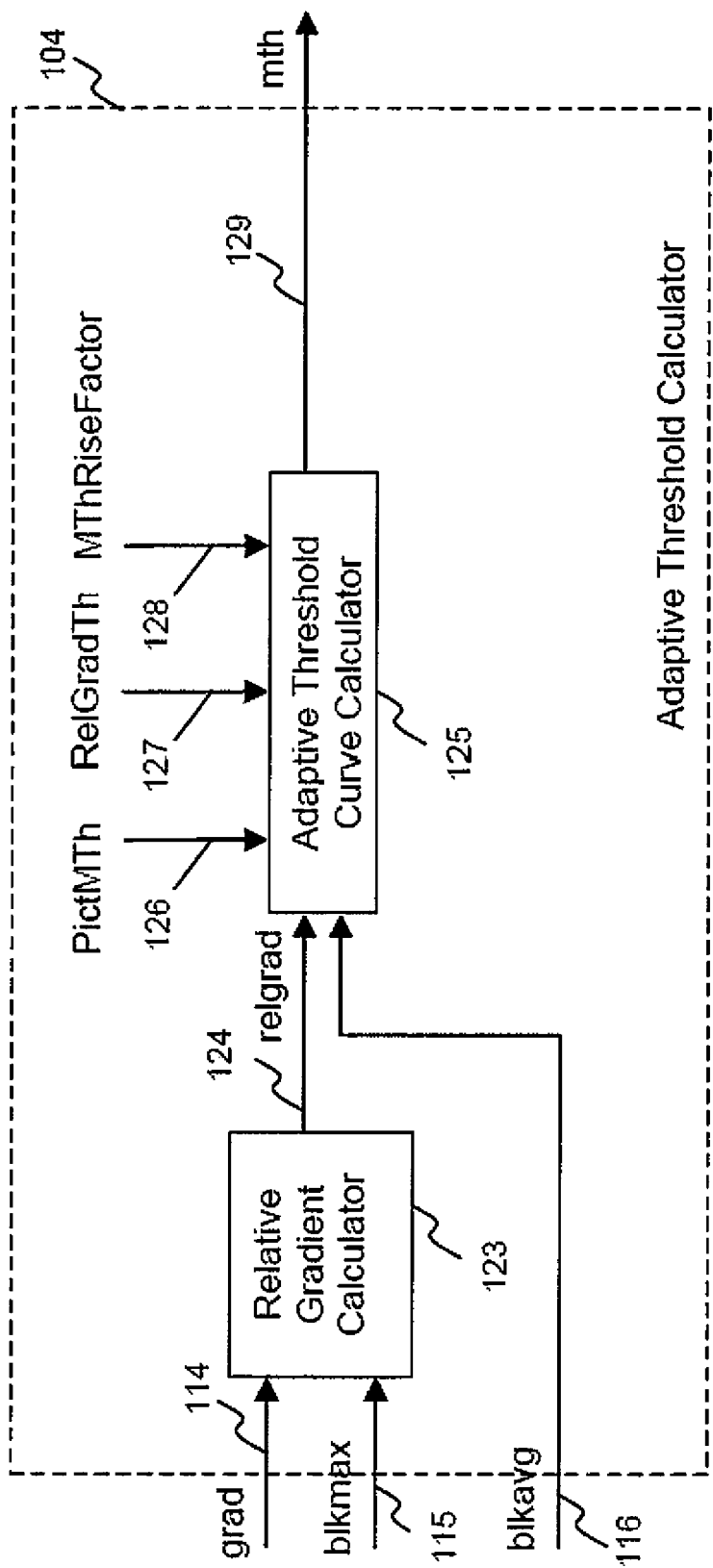
FIG. 4A is a block diagram of an adaptive threshold calculator of the apparatus of FIG. 1 according to one embodiment.

In one embodiment, the block memory buffer 120 stores the pixel gradients 114 of a DCT block. The maximum edge detector 121 provides the maximum edge gradient of a DCT block 115. The average edge detector 122 provides the average edge gradient of the pixels in a DCT block 116 with their relative gradient to the maximum gradient of the corresponding DCT block smaller than certain ratio r. An example ratio is r=3/8. The equations for calculating the maximum edge and average edge are as follows:

maximum edge magnitude of a block is expressed as $$grad_{max} = \max_{x,y \in DCTblock} \{grad_{x,y}\};$$

average edge magnitude for non-dominant edge of a block is expressed as $$grad_{avg} = \frac{\sum_{x,y \in DCTblock \cup (grad_{x,y}/grad_{max})<r} grad_{x,y}}{\sum_{x,y \in DCTblock} c};$$

where $c = \begin{cases} 1 & \text{if } (grad_{x,y}/grad_{max}) < r \\ 0 & \text{otherwise} \end{cases}$ FIG. 4A illustrates the adaptive threshold calculator 104 of the motion detector 200 of FIG. 1 according to one embodiment.

In one embodiment, the adaptive threshold calculation 104 includes a relative gradient calculator 123 and an adaptive threshold curve calculator 125. The relative gradient calculator 123 receives, from the edge and texture analyzer 103, for example, the pixel gradient magnitude 114 and the block maximum gradient magnitude 115 and outputs a ratio of the pixel gradient magnitude 114 and the block maximum gradient magnitude 115 which is represented as a relative gradient 124. The adaptive threshold curve calculator 125 receives the relative gradient 124 from the relative gradient calculator 123 and the average gradient magnitude in the pixels of the DCT block 116 or a block of surrounding pixels, form the edge and texture analyzer 103, for example. The adaptive threshold curve calculator 125 also receives pre-determined picture motion threshold 126, relative gradient threshold 127, and rising factor of the motion threshold 128 and outputs a pixel-based motion threshold 129 in accordance to the curve shown in FIG. 5. In one embodiment, the picture motion threshold 126, relative gradient threshold 127, and rising factor of the motion threshold 128 may be stored in some registers and programmable at firmware level by a user. In one embodiment, the picture motion threshold 126 is 4, the relative gradient threshold 127 is 3/8, and the rising factor of the motion threshold 128 is 8 for an optimal result of mosquito noise reduction.

Figure 4B:
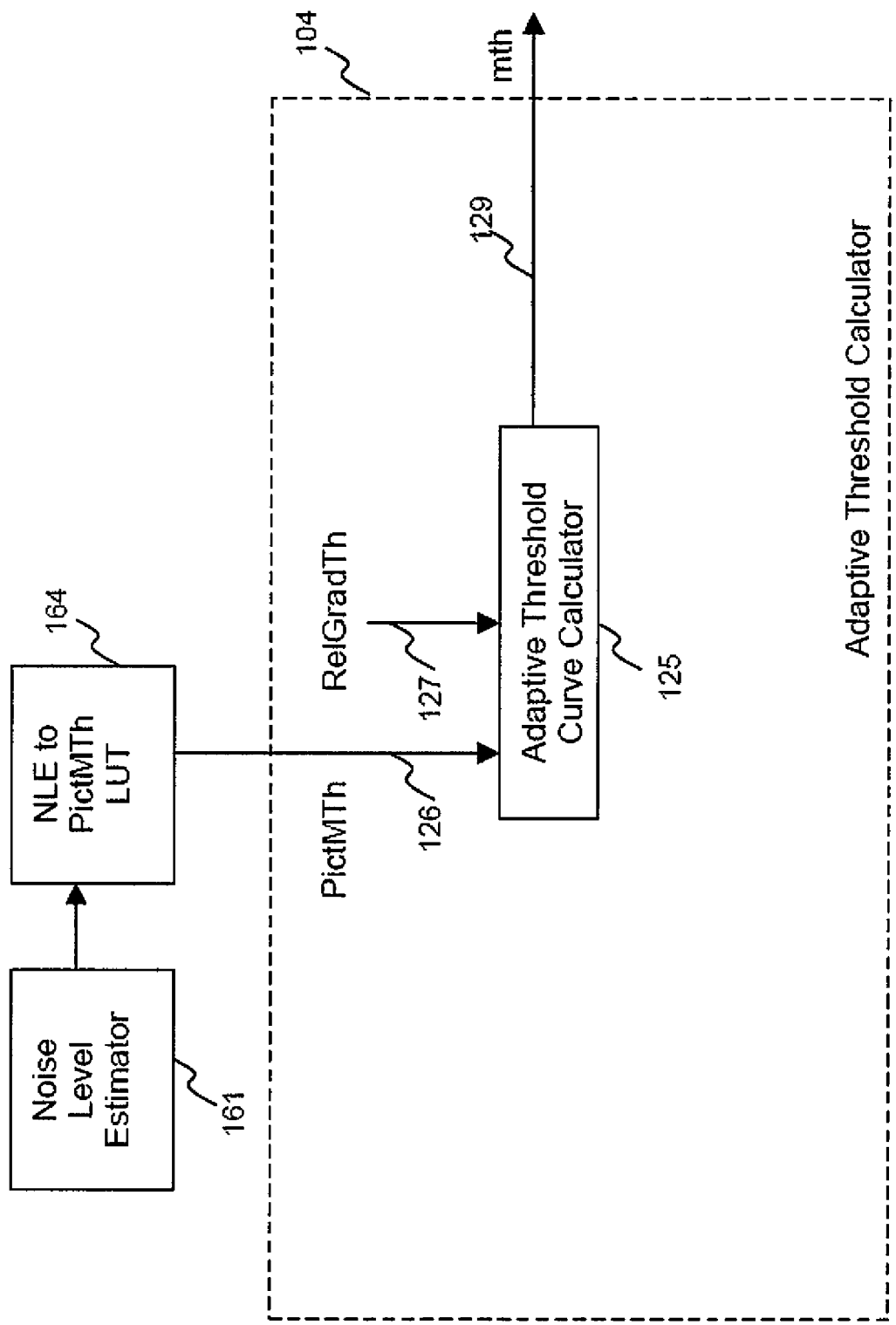
FIG. 4B is a block diagram of an adaptive threshold calculator of the apparatus of FIG. 1 according to another embodiment.

FIG. 4B illustrates the adaptive threshold calculator 104 of the motion detector 200 of FIG. 1 according to another embodiment.

In an alternative embodiment, the adaptive threshold calculator 104 includes the adaptive threshold curve calculator 125 that receives pre-determined picture motion threshold 126 and relative gradient threshold 127 to output the pixel-based motion threshold 129. The picture motion threshold 126 is automatically controlled by an external noise level estimator 161 through a look-up table (LUT) 164, such that the value of the motion threshold 126 is adaptively set according to a noise level estimated by the noise level estimator 161. The relative gradient threshold 127 may be set to 0, which effectively means all pixels in the picture are compared to the same motion threshold value and that the edge and texture analysis is not required in the adaptive threshold calculation.

Figure 5:
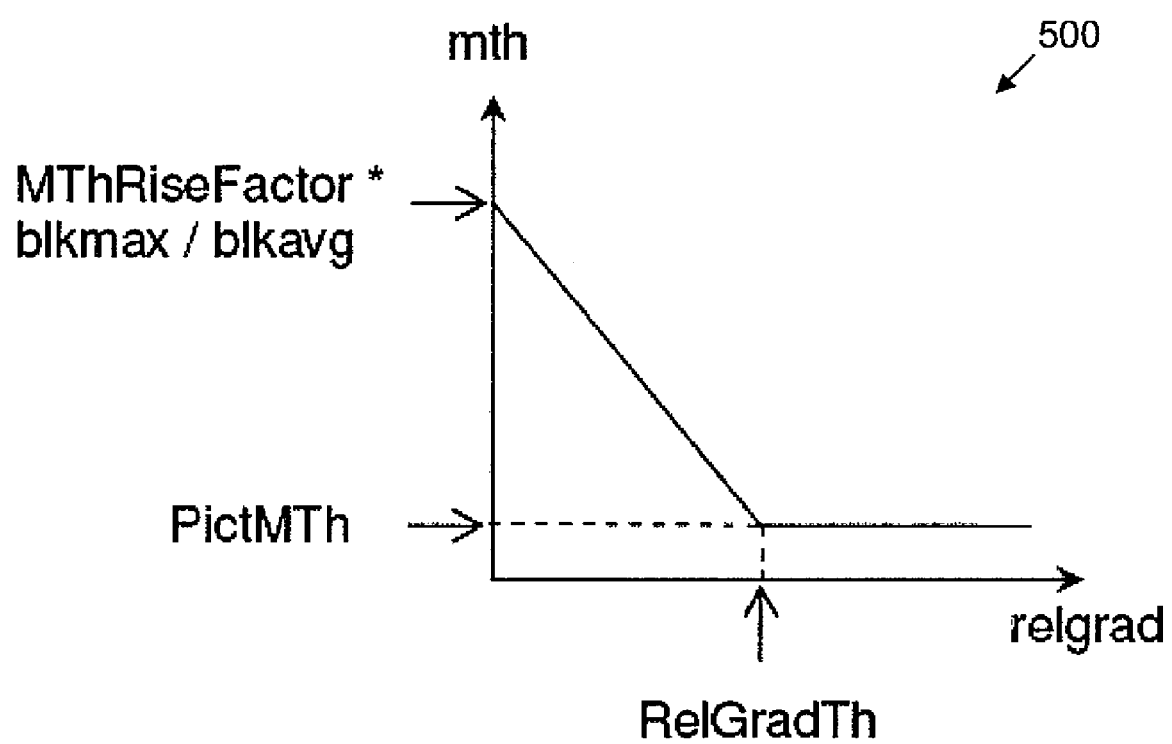
FIG. 5 is a diagram of a curve for calculating an adaptive threshold according to one embodiment.

FIG. 5 illustrates a diagram of a curve 500 for calculating an adaptive threshold according to one embodiment.

The horizontal axis of the curve 500 indicates the relative gradient value 124 (labeled as relgrad in FIG. 5). The vertical axis of the curve 500 indicates the motion threshold 129 of a pixel (labeled as mth in FIG. 5), which is the output of the adaptive threshold calculator 125. When the relative gradient value 124 is very small, e.g., 0, the motion threshold 129 is obtained by multiplying the maximum edge 115 and the rising factor of the motion threshold 128 and then dividing by the average edge 116 (shown as the point MThRiseFactor*blkmax/blkavg on the vertical axis in FIG. 5). The motion threshold 129 decreases as the relative gradient value 124 increases. When the relative gradient value 124 exceeds the relative gradient threshold 127 (shown as the point RelGradTh on the horizontal axis in FIG. 5), the output motion threshold 129 is equal to the picture motion threshold 126 (shown as the point PictMTh on the vertical axis in FIG. 5). As shown in FIG. 5, edges are well protected because the motion threshold 129 is low for pixels having large relative gradient 124, as will be appreciated by those ordinarily skilled in the art. The texture is also protected due to the adjustability of the highest point of the curve in FIG. 5, which is inversely proportional to the average gradient magnitude in the pixels of the DCT block 116. The robustness against mosquito noise is achieved by the high motion threshold 129 when the relative gradient 124 is low.

Figure 6A:
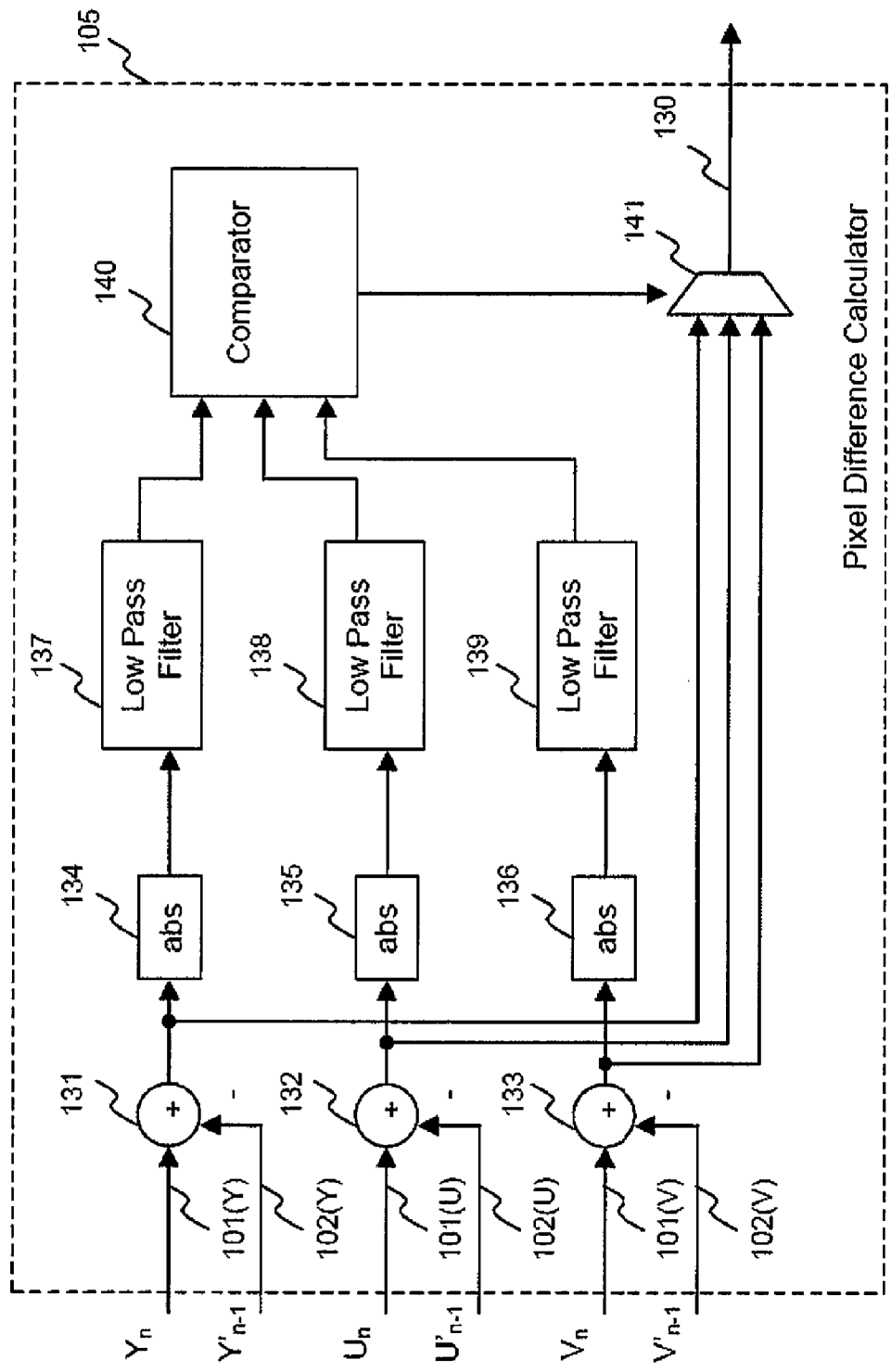
FIG. 6A is a block diagram of a pixel difference calculator of the apparatus of FIG. 1 according to one embodiment.

FIG. 6A illustrates the pixel difference calculator 105 of the motion detector 200 of FIG. 1 for providing a signed pixel difference signal according to one embodiment.

The pixel difference calculator 105 in one embodiment includes subtractors 131-133, absolute operators 134-136, low pass filters 137-139, a comparator 140, and a switch 141. The subtractor 131 receives the luminance Y components of the first and second video input signals 101 and 102 and outputs a signed difference between the luminance Y components of the first and second video input signals 101 and 102. The subtractor 132 receives the chrominance U components of the first and second video input signals 101 and 102 and outputs a signed difference between the chrominance U components of the first and second video input signals 101 and 102. The subtractor 133 receives the chrominance V components of the first and second video input signals 101 and 102 and outputs a signed difference between the chrominance V components of the first and second video input signals 101 and 102. That is, the subtractors 131-133 provide signed differences between the current frame and the filtered previous frame at each pixel position in the 3×3 window. The absolute operators 134-136 each receives the signed difference from one of the subtractors 131-133, respectively, to provide an absolute difference between the luminance Y, chrominance U, or chrominance V components of the first and second video input signals 101 and 102, respectively. Thus, the absolute operators 134-136 provide the absolute values of the differences between the current frame and the filtered previous frame at each pixel position in a 3×3 window. The low pass filters 137-139 each receives the absolute difference from one of the absolute operators 134-136, respectively, to provide an average value of the absolute difference between the current frame and the filtered previous frame at the center pixel position in the 3×3 window.

The comparator 140 receives the average values of the absolute differences from the low pass filters 137-139 to compare the average values of the absolute differences, and selects one of the components and outputs the selected component. In one embodiment, the component with the largest difference value, representing the most significant motion, is selected. The switch 141, which may be a multiplexer in one embodiment, receives the signed differences from the subtractors 131-133 and the output of the comparator 140. Based on the output of the comparator 140, the switch 141 outputs the pixel difference 130 of the component that has the most significant motion. Accordingly, the pixel difference 130 is a signed pixel difference. Thus, the inventive use of the low pass filters 137-139 advantageously avoids having the noise value mistaken as a motion value.

Figure 6B:
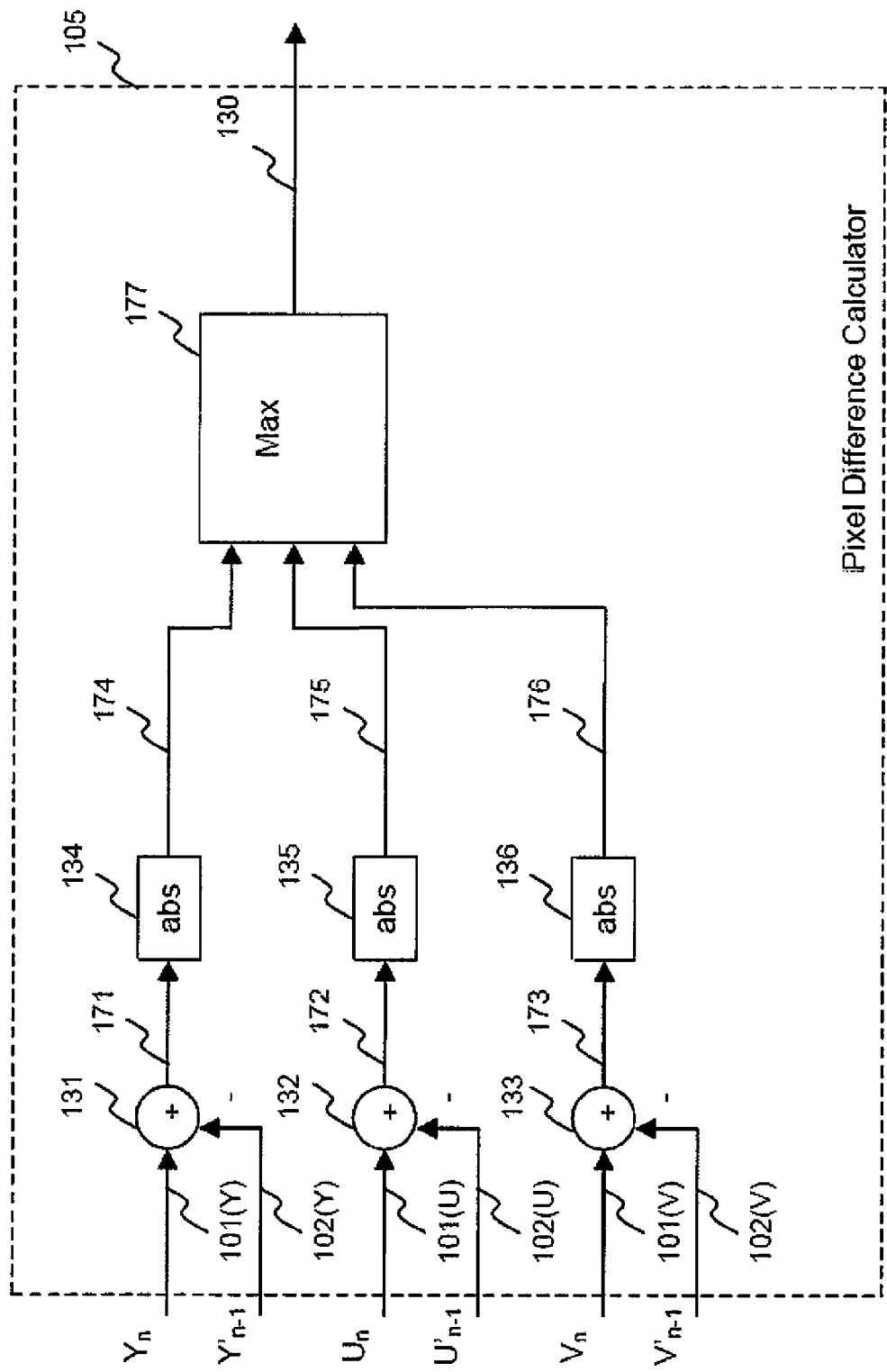
FIG. 6B is a block diagram of a pixel difference calculator of the apparatus of FIG. 1 according to another embodiment.

FIG. 6B illustrates the pixel difference calculator 105 of the motion detector 200 of FIG. 1 for providing an unsigned pixel difference signal according to another embodiment.

In this embodiment, the pixel difference calculator 105 includes subtractors 131-133, absolute operators 134-136, and a maximum operator 177. As described above, the subtractors 131-133 provide signed differences 171-173 of the luminance Y and chrominance U/V components of the first and second video input signals 101 and 102. Likewise, the absolute operators 134-136 provide absolute differences 174-176 of the luminance Y and chrominance U/V components of the first and second video input signals 101 and 102. The maximum operator 177 receives the outputs of the absolute operators 174-176 and outputs the pixel difference 130 that has the most significant motion. Accordingly, the pixel difference 130 is an unsigned pixel difference, and is provided to the motion classifier 106 for unsigned thresholding.

Figure 7A:
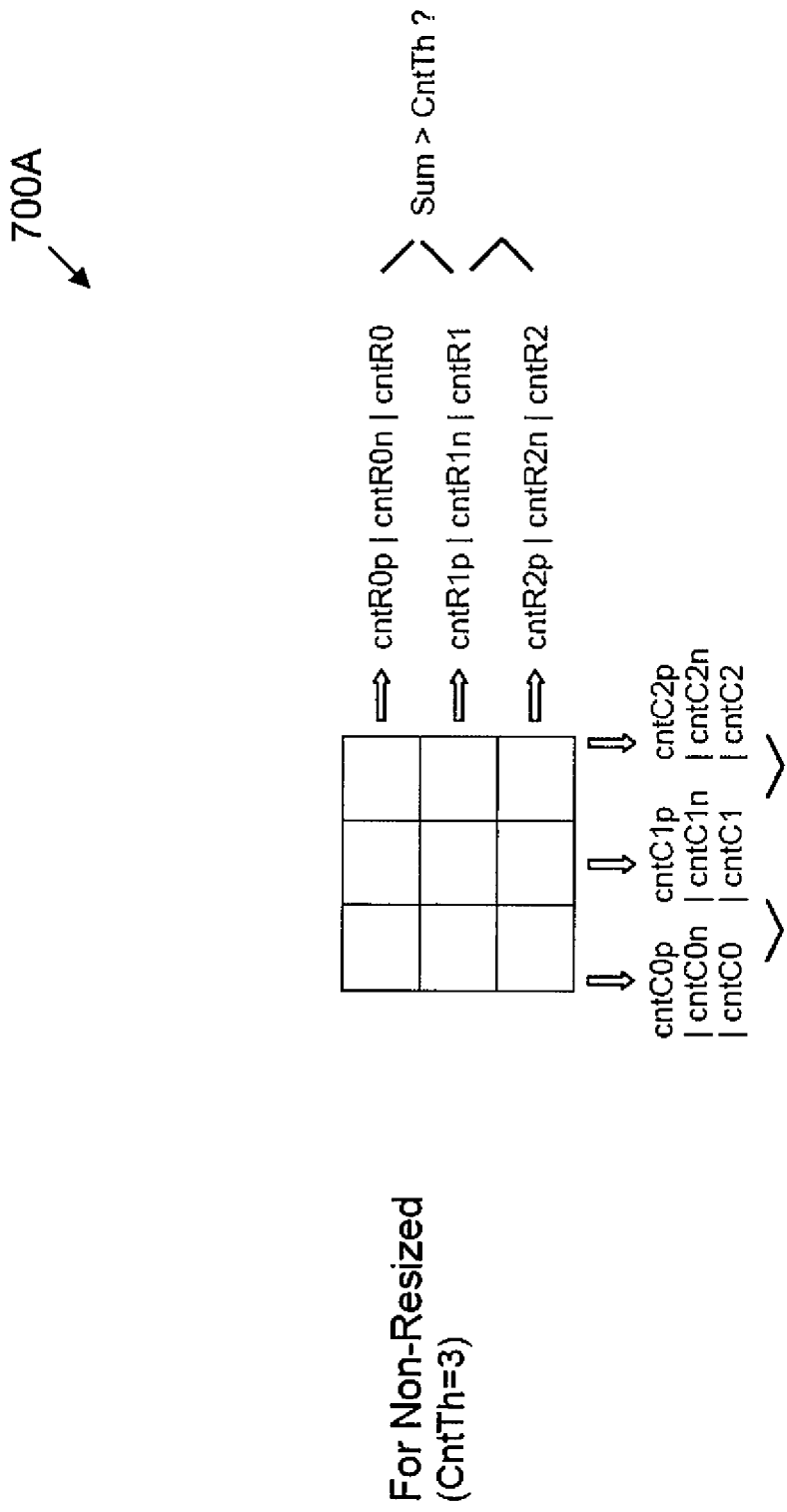
FIGS. 7A and 7B are each a diagram of processing windows of a motion classifier according to one embodiment.
Figure 7B:
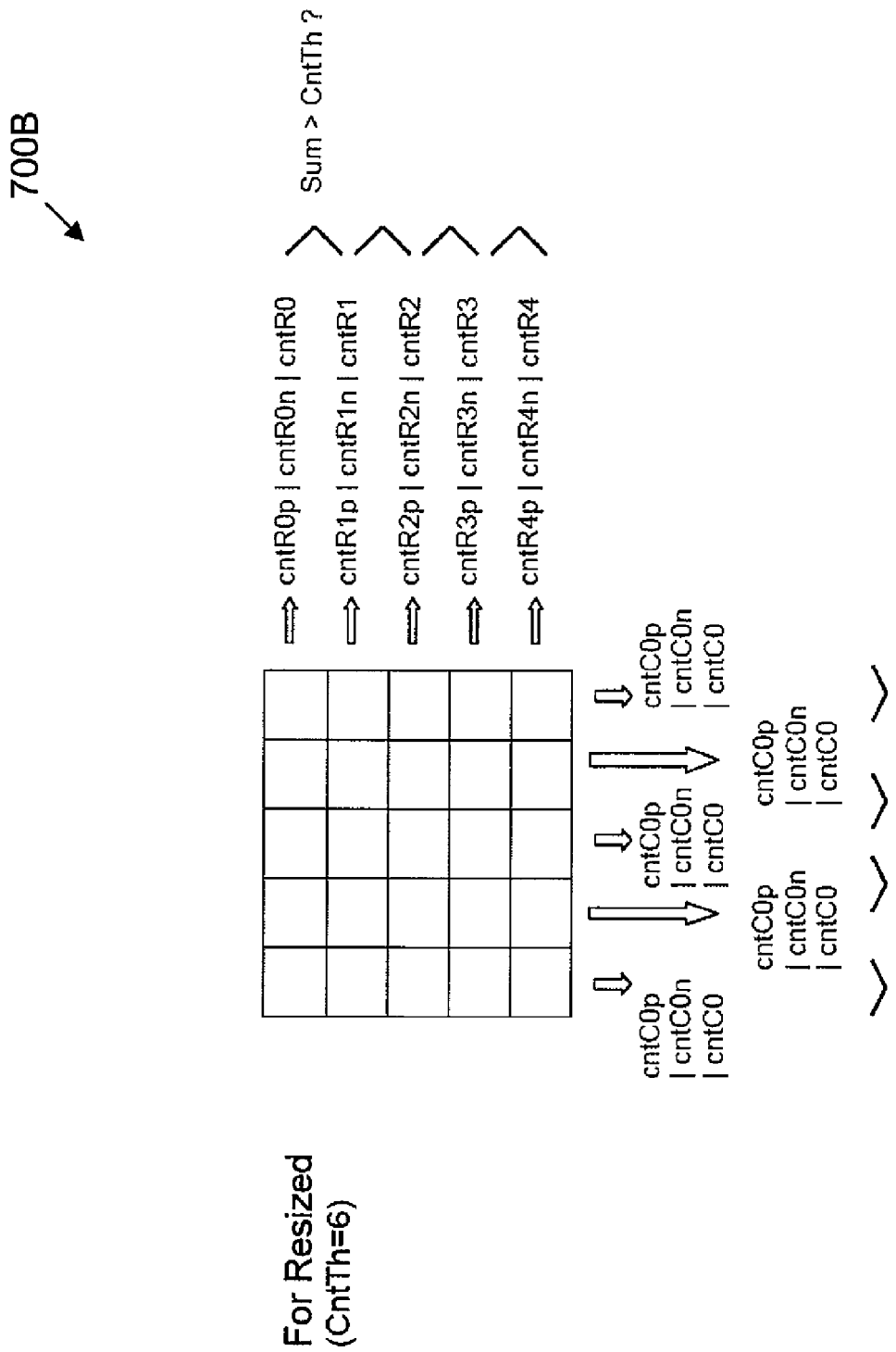

FIG. 7 illustrates a diagram of processing windows of the motion classifier 106 for non-resized and resized images according to one embodiment.

As described above, the motion classifier 106 receives the pixel difference 130 of the first and second video input signals 101 and 102 from the pixel difference calculator 105. The pixel difference 130 of each pixel in the processing window is compared to the pixel-based motion threshold 129 of the respective pixel provided by the adaptive threshold calculator 104. For each row and each column, there are two counts counting respectively the positive and negative pixel difference with their absolute magnitude larger than the motion threshold 129. The counts of the same sign in the adjacent two rows and the adjacent two columns are then summed up and compared to a count threshold CntTh. If there is any sum of the counts with the same sign in any adjacent two rows or adjacent two columns larger than the count threshold CntTh, the center pixel is classified as a motion pixel. Otherwise, the center pixel is classified as a non-motion pixel. For example, for a non-resized image, cntR0$p$ is the count of positive pixel difference with its absolute magnitude larger than the motion threshold for the respective pixel in the first row and, similarly, cntR1$p$ is the count of positive pixel difference exceeding the respective motion threshold in the second row. If the sum of cntR0$p$ and cntR1$p$ is greater than CntTh (cntR0$p$+cntR1$p$>CntTh), which is 3 for a non-resized image, then the center pixel is classified as a motion pixel. Note that cntR0$p$ and cntR1$p$ are counts of the same sign, which is the positive sign in this example, and the first row and the second row are adjacent two rows. Any similar case will yield the same classification result of the center pixel. The classification of the pixel is output by the motion classifier 106 as the motion classification decision 142.

While the processing window for a non-resized image is 3×3, the processing window for a resized image may be optimized for different zoom factors. As shown in FIG. 7, the processing window for a resized image is 5×5. The count threshold implemented is 3 for the non-resized image and is 6 for the resized image. The count threshold, together with the size of the processing window, forces the pixels being summed to be more or less connected spatially. The signed thresholding and the spatial connectivity check improve the robustness of the classifier against noise.

In one embodiment, the motion classifier 106 performs unsigned thresholding and spatial connectivity check. For example, as shown in FIG. 7 for the non-resized image, cntR0 is the count of the absolute pixel difference larger than the motion threshold 129 for the respective pixel in the first row. Similarly, cntR1 is the count of absolute pixel difference exceeding the respective motion threshold 129 in the second row. If the sum of cntR0 and cntR1 is greater than CntTh (cntR0+cntR1>CntTh), which is 3 for non-resized image, then the center pixel is classified as a motion pixel.

In another embodiment, the motion classifier 106 performs signed and unsigned thresholding and spatial connectivity check to improve the robustness against noise and secure the strong but thin edges at the same time. In this case, the motion threshold value for the unsigned thresholding should be set higher, i.e., such as 5/4 times the motion threshold for the signed thresholding.

Figure 8:
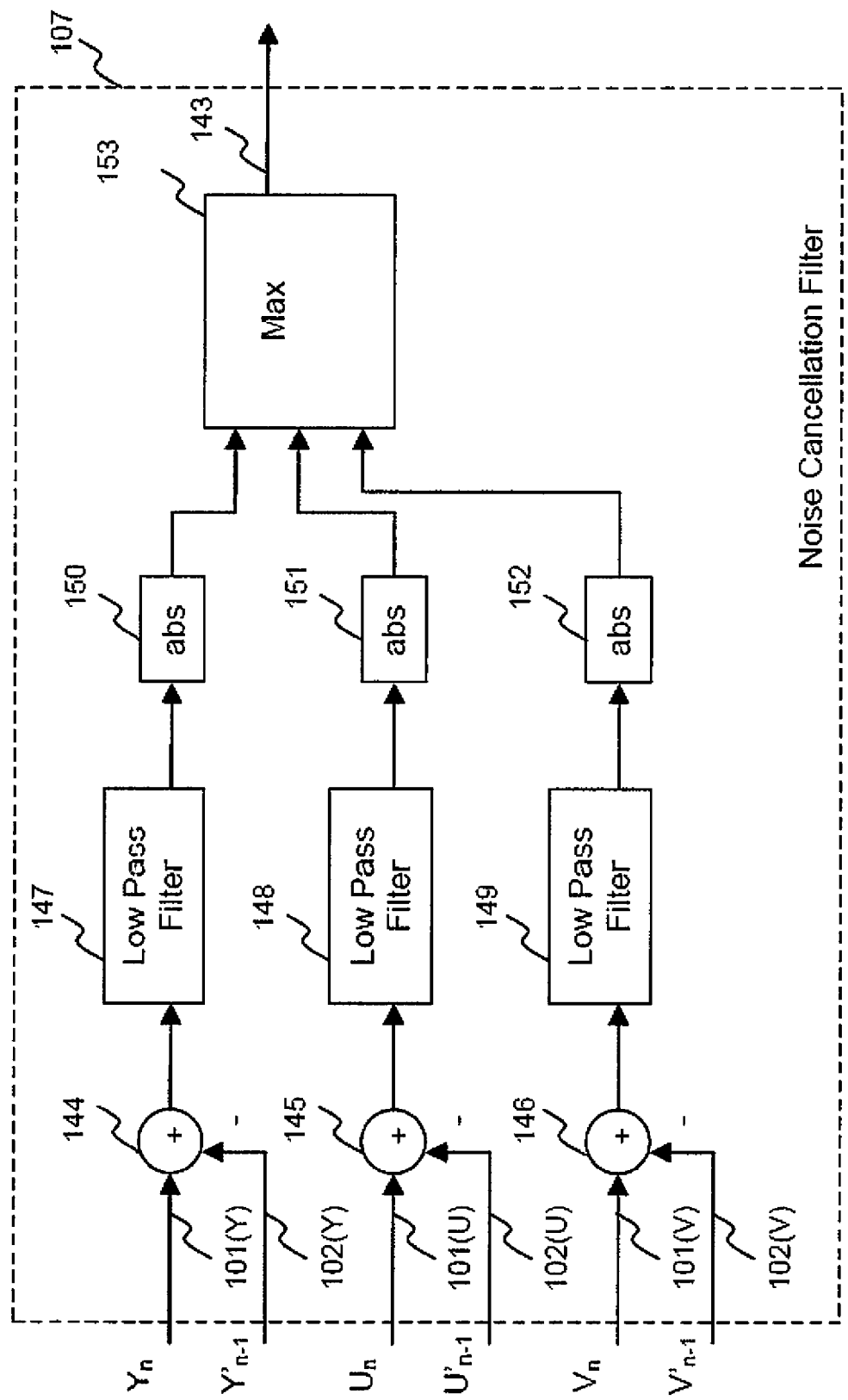
FIG. 8 is a block diagram of a noise cancellation filter of the apparatus of FIG. 1 according to one embodiment.

FIG. 8 illustrates the noise cancellation filter 107 of the motion detector 200 of FIG. 1 according to one embodiment.

The noise cancellation filter 107 in one embodiment includes subtractors 144-146, low pass filters 147-149, absolute operators 150-152, and a maximum operator 153. The subtractor 144 receives the luminance Y components of the first and second video input signals 101 and 102 and outputs a signed difference between the luminance Y components of the first and second video input signals 101 and 102. The subtractor 145 receives the chrominance U components of the first and second video input signals 101 and 102 and outputs a signed difference between the chrominance U components of the first and second video input signals 101 and 102. The subtractor 146 receives the chrominance V components of the first and second video input signals 101 and 102 and outputs a signed difference between the chrominance V components of the first and second video input signals 101 and 102. That is, the subtractors 144-146 provide signed differences between the luminance Y and chrominance U/V components of the first and second video input signals 101 and 102. The low pass filters 147-149 receive the signed difference values from the subtractors 144-146 and cancel out the noise of the differences by averaging the signed difference values.

Each of the low pass filters 147-149 averages the signed value generated by the respective subtractor 144-146 in a processing window according to the following equation (for the luminance Y component):

$$Y_{avg}(i,j) = \frac{\sum_{\substack{k \in [i-m, i+m], \\ l \in [i-m, j+m]}} [Y_n(k,l) - Y'_{n-1}(k,l)]}{(2m+1)^2},$$

where $Y_{avg}(i,j)$ is the average of the signed differences at pixel $(i,j)$, $[Y_n(k,l) - Y'_{n-1}(k,l)]$ is the signed difference of the current frame and a filtered previous frame at pixel coordinate $(k,l)$ within the $(2m+1) \times (2m+1)$ window centered at pixel $(i,j)$.

In one embodiment, m=2 for a resized image (2m+1=5), and m=1 for a non-resized image (m+1=3). Similar equations apply for processing of the chrominance U/V components, $U_{avg}(i,j)$ and $V_{avg}(i,j)$.

The absolute operators 150-152 receive the outputs of the low pass filters 147-149 and output the absolute values of the averaged signed differences of the luminance Y and chrominance U/V components between the first and second video input signals 101 and 102 to the maximum operator 153. The maximum operator 153 selects the received value that has the maximum magnitude and outputs it as the suppressed motion value 143. Accordingly, the motion value of noise can be suppressed in this fashion, as will be appreciated by those ordinarily skilled in the art.

In an alternative embodiment, the noise cancellation filter 107 may additionally include comparators such that a comparator is coupled between a respective subtractor 144-146 and a respective low pass filter 147-149. The comparators serve to exclude certain number of pixel differences with the highest magnitude for further noise cancellation.

Figure 9A:
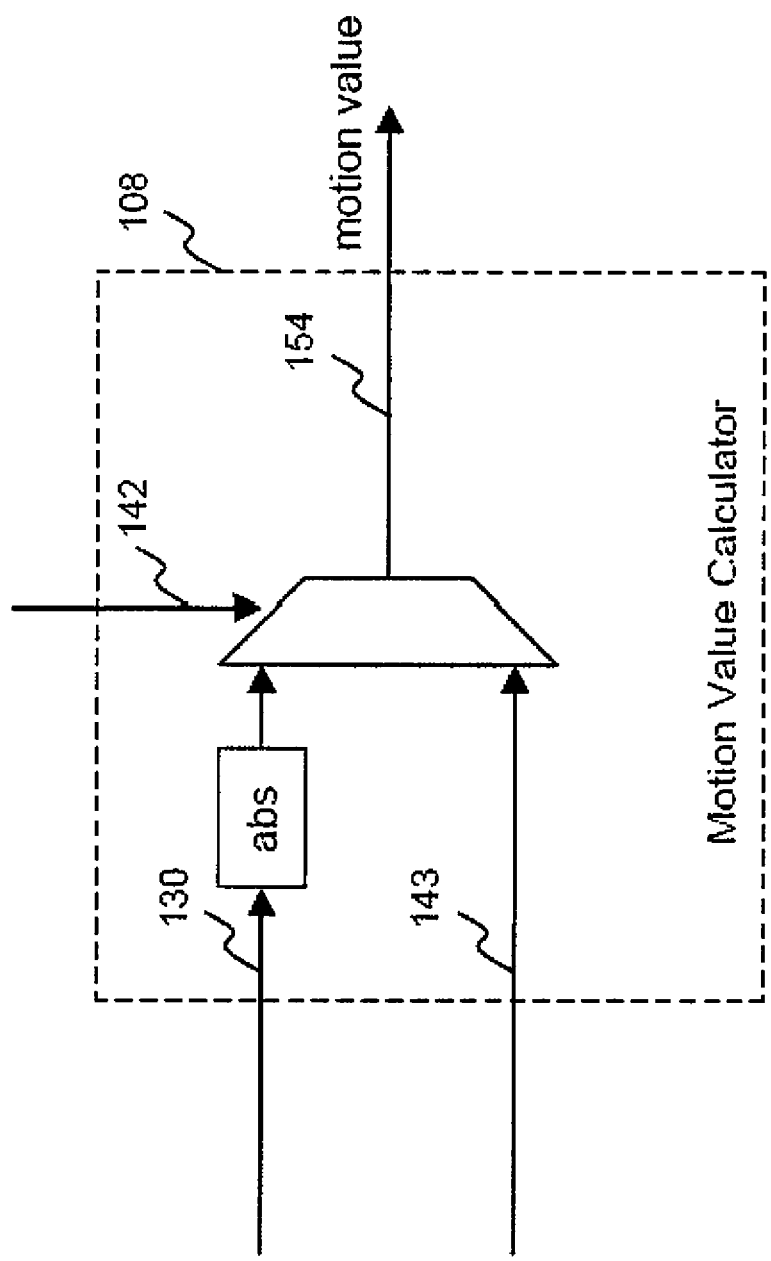
FIG. 9A is a block diagram of a motion value calculator of the apparatus of FIG. 1 according to one embodiment.

FIG. 9A illustrates the motion value calculator 108 of the motion detector 200 of FIG. 1 for mosquito noise reduction according to one embodiment.

The motion value calculator 108 in one embodiment includes an absolute operator 159a and a switch 159s, which may be a multiplexer. The absolute operator 159a receives the motion value, or pixel difference 130, and outputs an absolute value of the pixel difference 130. The switch 159s receives the absolute value of the pixel difference 130 from the absolute operator 159a and the suppressed motion value 143 from the noise cancellation filter 107, and is controlled by the motion classification decision 142 provided by the motion classifier 106. If the pixel is classified as a motion pixel, the output motion value is the absolute motion value, or the absolute value of the pixel difference 130 from the pixel difference calculator 105, else the output motion value is the suppressed motion value 143 from the noise cancellation filter 107.

Figure 9B:
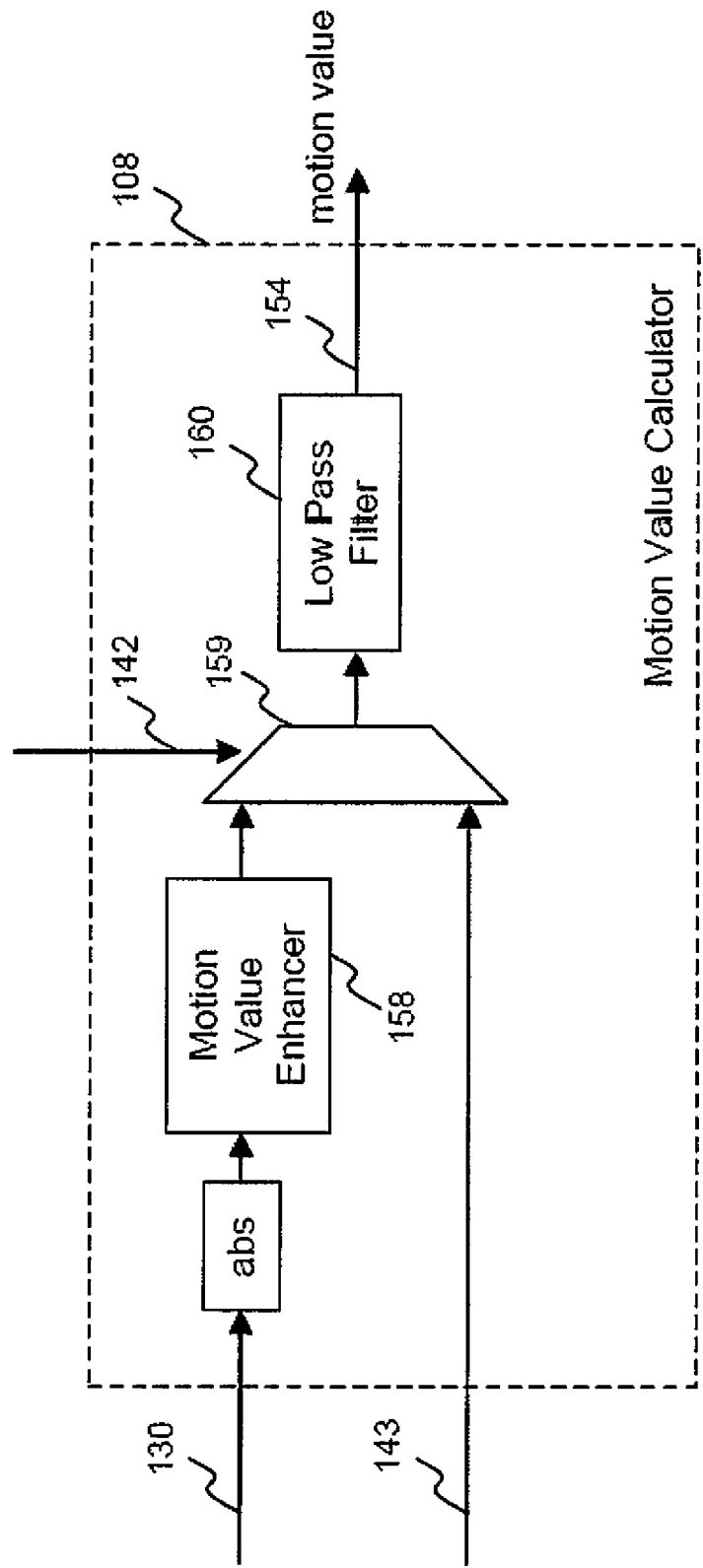
FIG. 9B is a block diagram of a motion value calculator of the apparatus of FIG. 1 according to another embodiment.

FIG. 9B illustrates the motion value calculator 108 of the motion detector 200 of FIG. 1 for random noise reduction according to another embodiment.

The motion value calculator 108 in this embodiment includes a motion value enhancer 158, the absolute operator 159a, the switch 159s, and a low pass filter 160. The motion value enhancer 158 receives the output of the absolute operator 159a and enhances the absolute pixel difference 130 by taking the maximum pixel difference in a processing window as shown in FIG. 10.

Figure 10:
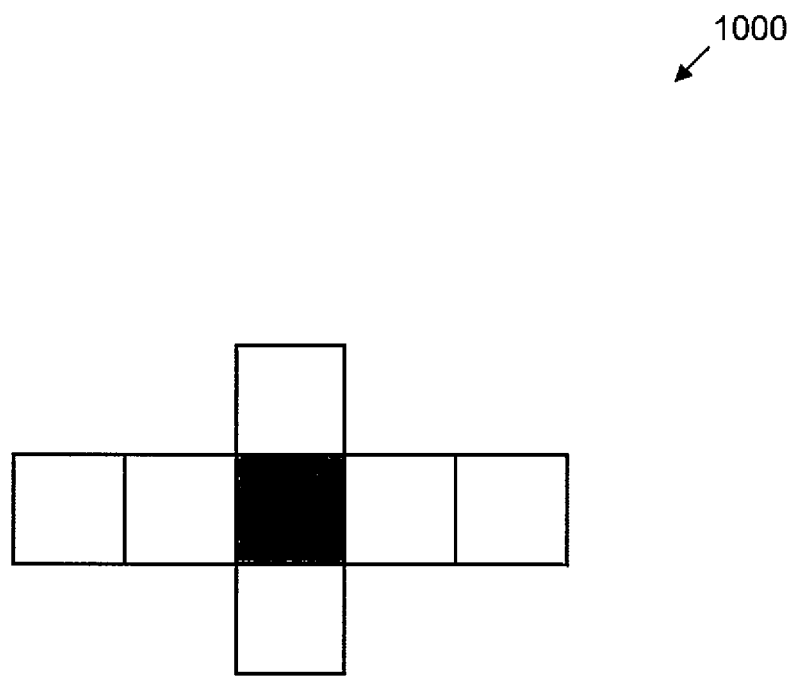
FIG. 10 is a spatial diagram of processing windows of a motion value enhancer according to one embodiment.

FIG. 10 illustrates a spatial diagram of processing windows of the motion value enhancer 108 according to one embodiment.

According to the processing window shown in FIG. 10, the maximum pixel difference in a spatial processing window can be expressed as:

$$M = \max(D_{i,j}, D_{i-1,j}, D_{i+1,j}, D_{i,j-1}, D_{i,j+1}, D_{i,j-2}, D_{i,j+2}),$$

where

M is the motion value, and $D_{i,j}$ is the absolute difference signal of the pixel (i,j).

Referring back to FIG. 9B, the switch 159s selects the enhanced pixel difference 130 provided by the motion value enhancer 158 or the suppressed pixel difference 143 provided by the noise cancellation filter 107 depending on the motion classification decision 142. If the pixel is classified as a motion pixel, the enhanced pixel difference 130 is selected, else the suppressed pixel difference 143 is selected. The selected pixel difference is filtered by the low pass filter 160 in order to have a smooth transition of motion values between stationary and moving regions. In particular, the low pass filter 160 filters the selected pixel difference in a 5-pixel horizontal window according to the following equation:

$$m_{LP}(i, j) = \frac{m(i, j-2) + 4 \times m(i, j-1) + 6 \times m(i, j) + 4 \times m(i, j+1) + m(i, j+2)}{16},$$

where m is the selected pixel difference, and $m_{LP}(i,j)$ is the low-pass filtered motion value at pixel (i,j).

Accordingly, the motion value thus calculated is discriminated such that the temporal filtering will be stronger at noise area and be conservative at real motion area. As a result, noise can be effectively reduced while edges and textures are protected from being blurred.

Figure 11A:
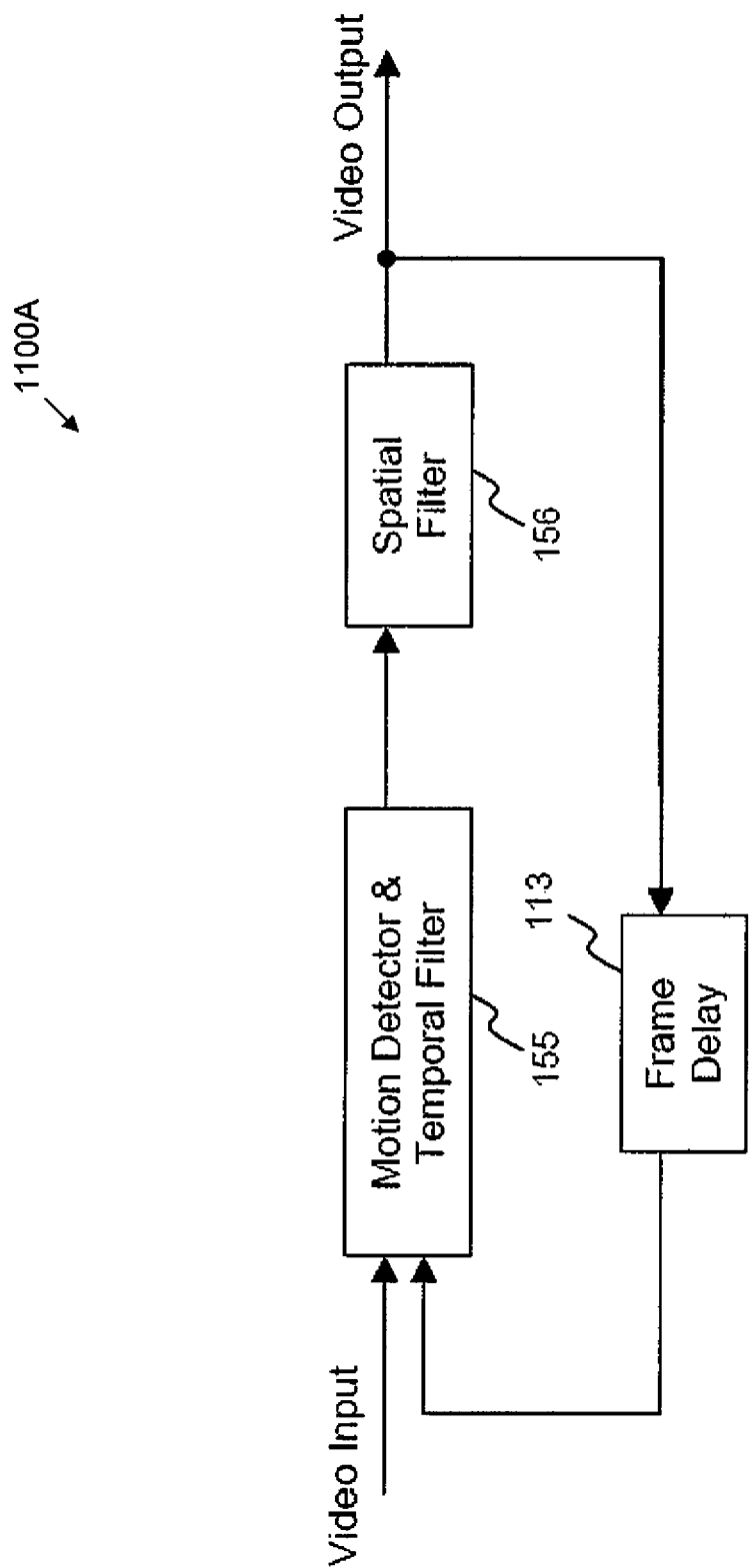
FIG. 11A is a block diagram of a digital image noise reduction device according to one embodiment.

FIG. 11A illustrates a digital image noise reduction device 1100a according to one embodiment.

The noise reduction device 1100a includes a motion detection and temporal filter unit 155, a spatial filer unit 156, and the frame delay unit 113. In one embodiment, the motion detection and temporal filter unit 155 comprises the motion detector 200. The combination of the motion detection and temporal filter unit 155 and the spatial filer unit 156 is believed to reduce noise more completely and efficiently. The spatial filter unit 156 is integrated with the motion detection and temporal filter unit 155 in a cascaded order. A video input signal is received by the motion detection and temporal filter unit 155, which provides a temporally filtered signal to the spatial filter unit 156. The video output signal provided by the spatial filter unit 156 is recursively fed back to the motion detection and temporal filter unit 155 through the frame delay unit 113.

Figure 11B:
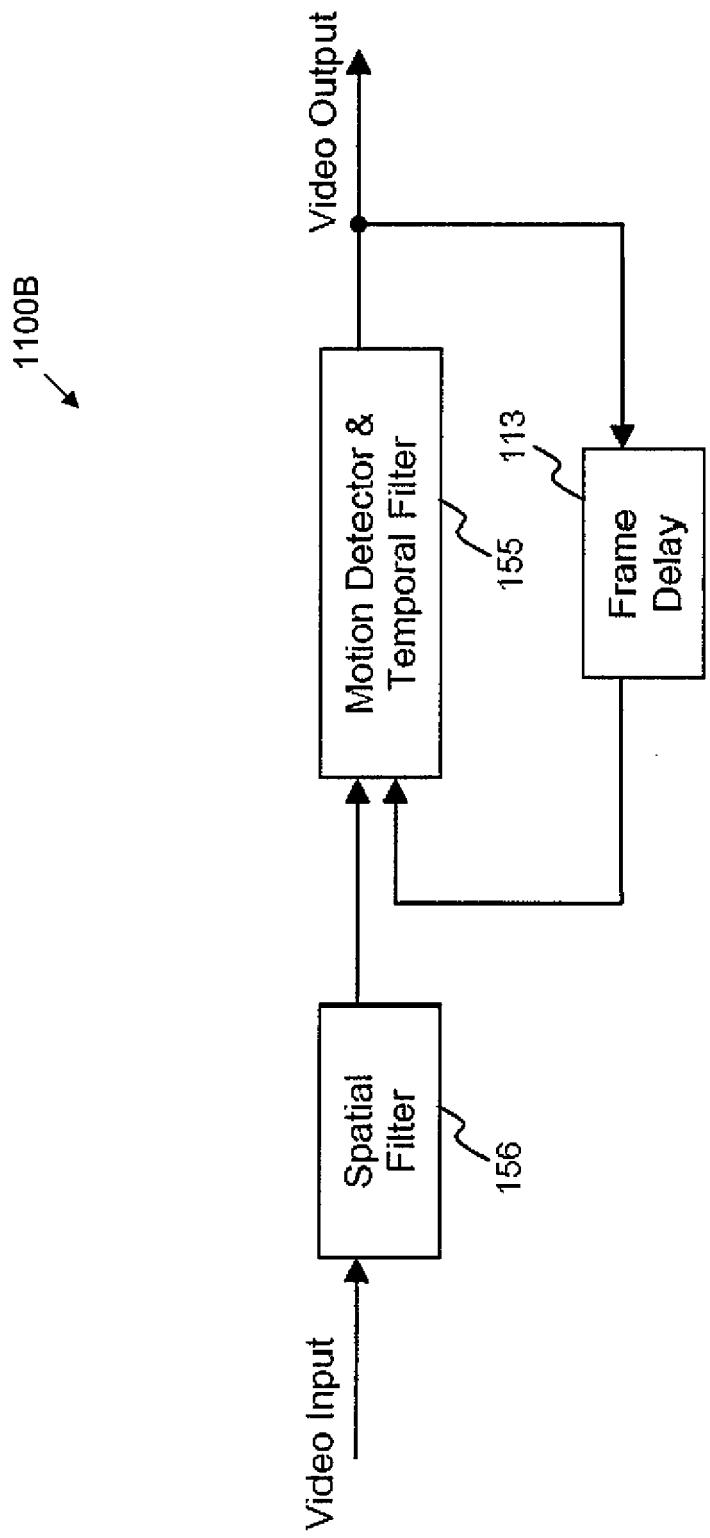
FIG. 11B is a block diagram of a digital image noise reduction device according to another embodiment.

FIG. 11B illustrates a digital image noise reduction device 1100b according to another embodiment.

In the noise reduction device 1100b, the spatial filter unit 156 is also integrated with the motion detection and temporal filter unit 155 in a cascaded order, but the spatial filter unit 156 receives the video input signal and provides a spatially filtered signal to the motion detection and temporal filter 155.

Figure 11C:
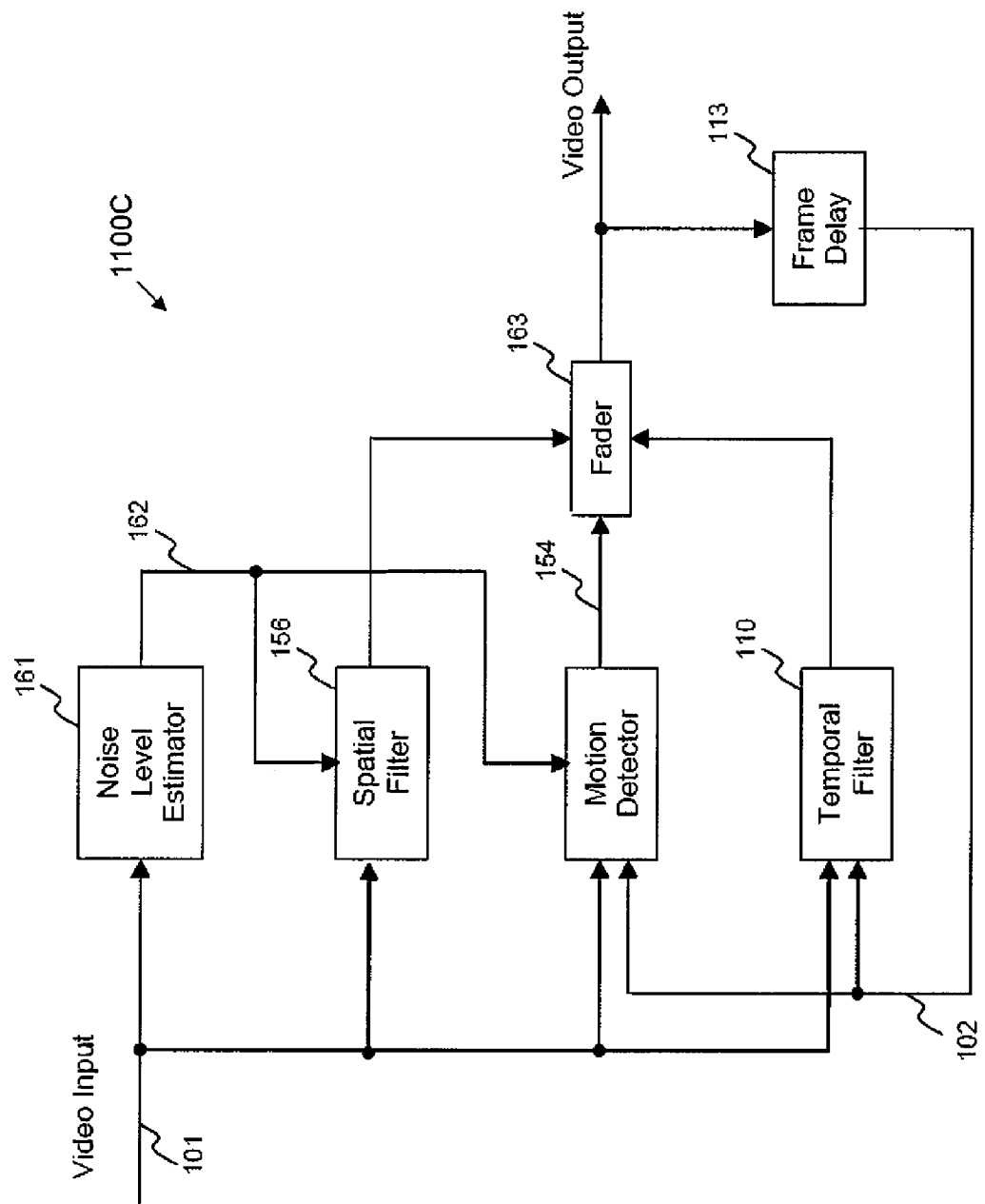
FIG. 11C is a block diagram of a digital image noise reduction device according to yet another embodiment.

FIG. 11C illustrates a digital image noise reduction device 1100c according to yet another embodiment.

The noise reduction device 1100c includes a noise level estimator 161, the spatial filter unit 156, the motion detector 200, the temporal filter 110, a fader 163, and the frame delay unit 113. The noise level estimator 161, the spatial filter unit 156, the motion detector 200, and the temporal filter 110 each receives a video input signal. The fader 163 receives the outputs of the spatial filter unit 156, the motion detector 200, and the temporal filter 110 to provide a video output signal, which is delayed by the frame delay unit 113 and fed back to the motion detector 200 and the temporal filter 110. The noise level estimator 161 provides a picture noise level for the spatial filter unit 156 and the motion detector 200 to allow the filtering and the motion detection to be adaptive to the noise level. The motion value detected in the motion detector 200 is provided to the fader 163 to control the fading factor of the spatially filtered and the temporally filtered signals.

Figure 12A:
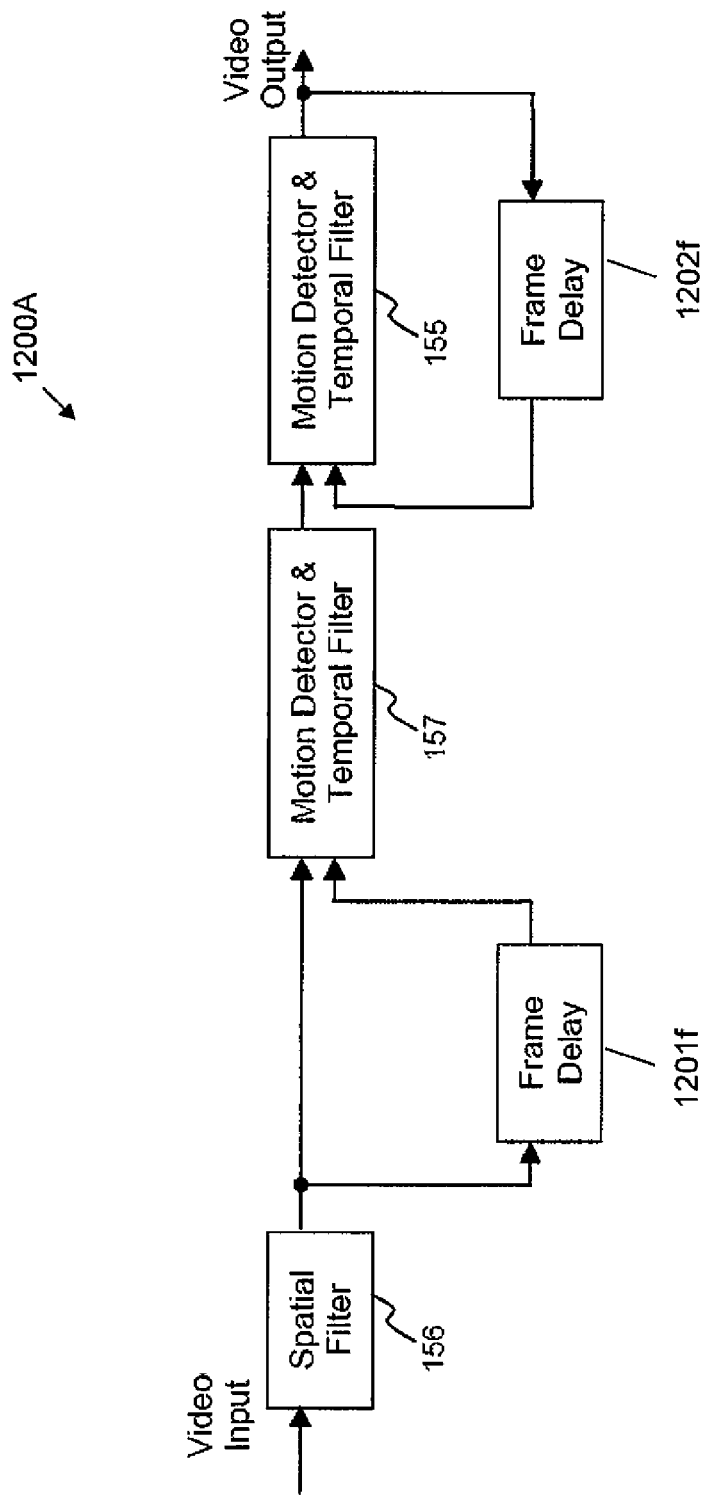
FIG. 12A is a block diagram of a bidirectional digital image noise reduction device according to one embodiment.

FIG. 12A illustrates a bidirectional digital image noise reduction device 1200a according to one embodiment.

Figure 12B:
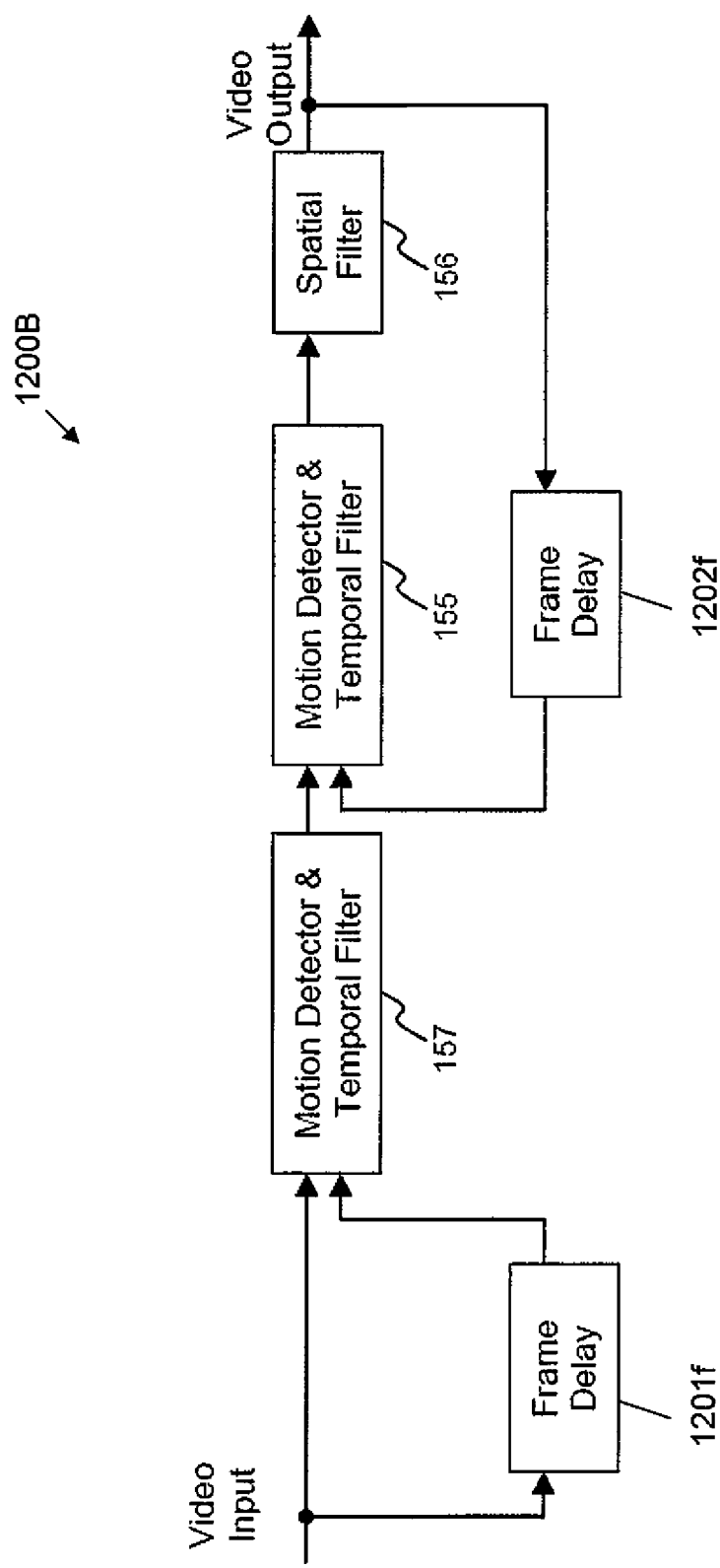
FIG. 12B is a block diagram of a bidirectional digital image noise reduction device according to another embodiment.
Figure 12C:
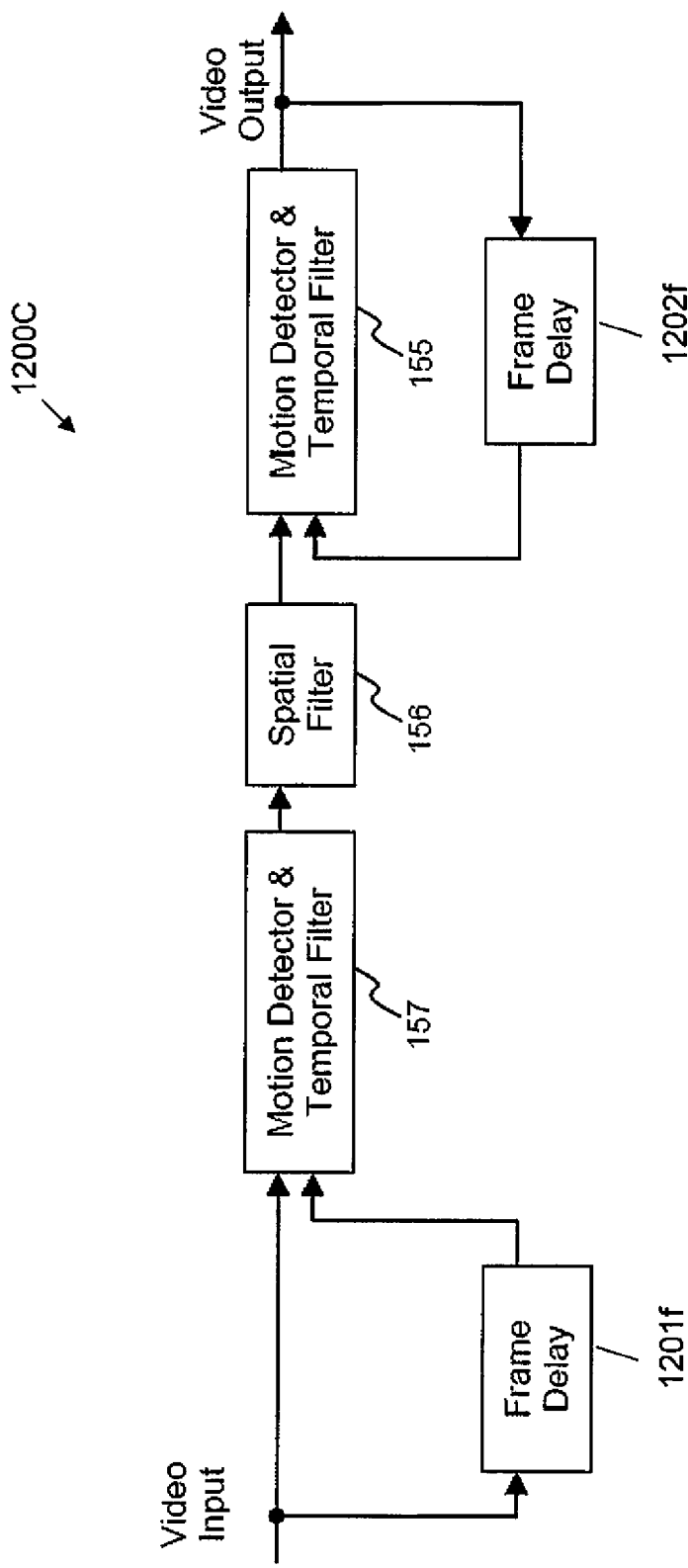
FIG. 12C is a block diagram of a bidirectional digital image noise reduction device according to yet another embodiment.

A temporal mosquito noise reduction device can be used for both forward and backward filtering, as shown in FIGS. 12A-12C in the form of a bi-directional temporal noise reduction device. A bidirectional temporal noise reduction device can be used in complementary with a spatial noise reduction device to reduce noise even more completely.

The bidirectional noise reduction devices 1200a, 1200b, and 1200c shown in FIGS. 12A, 12B, and 12C, respectively, includes a forward temporal filter unit 157 receiving a first input signal and a delayed version of the first input signal provided by a first frame delay unit 1201f, a backward temporal filter unit 155 receiving a second input signal and a delayed version of the second input signal provided by a second frame delay unit 1202f, and a spatial filter unit 156. In one embodiment, the forward temporal filter unit 157 comprises the motion detector 200 and the temporal filter 110 of FIG. 1. In one embodiment, the backward temporal filter unit 155 comprises the motion detector 200 of FIG. 1 and the temporal filter 110 of FIG. 1. The forward temporal filter unit 157 interpolates the current frame and the next frame, and provides a forward filtered current frame. The backward temporal filter unit 155 interpolates the forward filtered current frame and the bi-directional filtered previous frame, and provides the bi-directional filtered current frame.

In the bidirectional noise reduction device 1200a, the spatial filter unit 156 receives the video input signal and outputs a spatially filtered signal to the forward temporal filter unit 157. The forward temporal filter unit 157 outputs a temporally filtered signal to the backward temporal filter unit 155, which outputs the video output signal.

FIG. 12B illustrates a bidirectional digital image noise reduction device according to another embodiment.

In the bidirectional noise reduction device 1200b, the forward temporal filter unit 157 receives the video input signal and outputs a temporally filtered signal to the backward temporal filter unit 155, the output of which is provided to the spatial filter unit 156. The spatial filter unit in turn outputs the video output signal.

FIG. 12C illustrates a bidirectional digital image noise reduction device according to yet another embodiment.

In the bidirectional noise reduction device 1200c, the forward temporal filter unit 157 receives the video input signal and outputs a temporally filtered signal to the spatial filter unit 156. The spatial filter unit 156 outputs a spatially filtered signal to the backward temporal filter unit 155, which outputs the video output signal.

Figure 13:
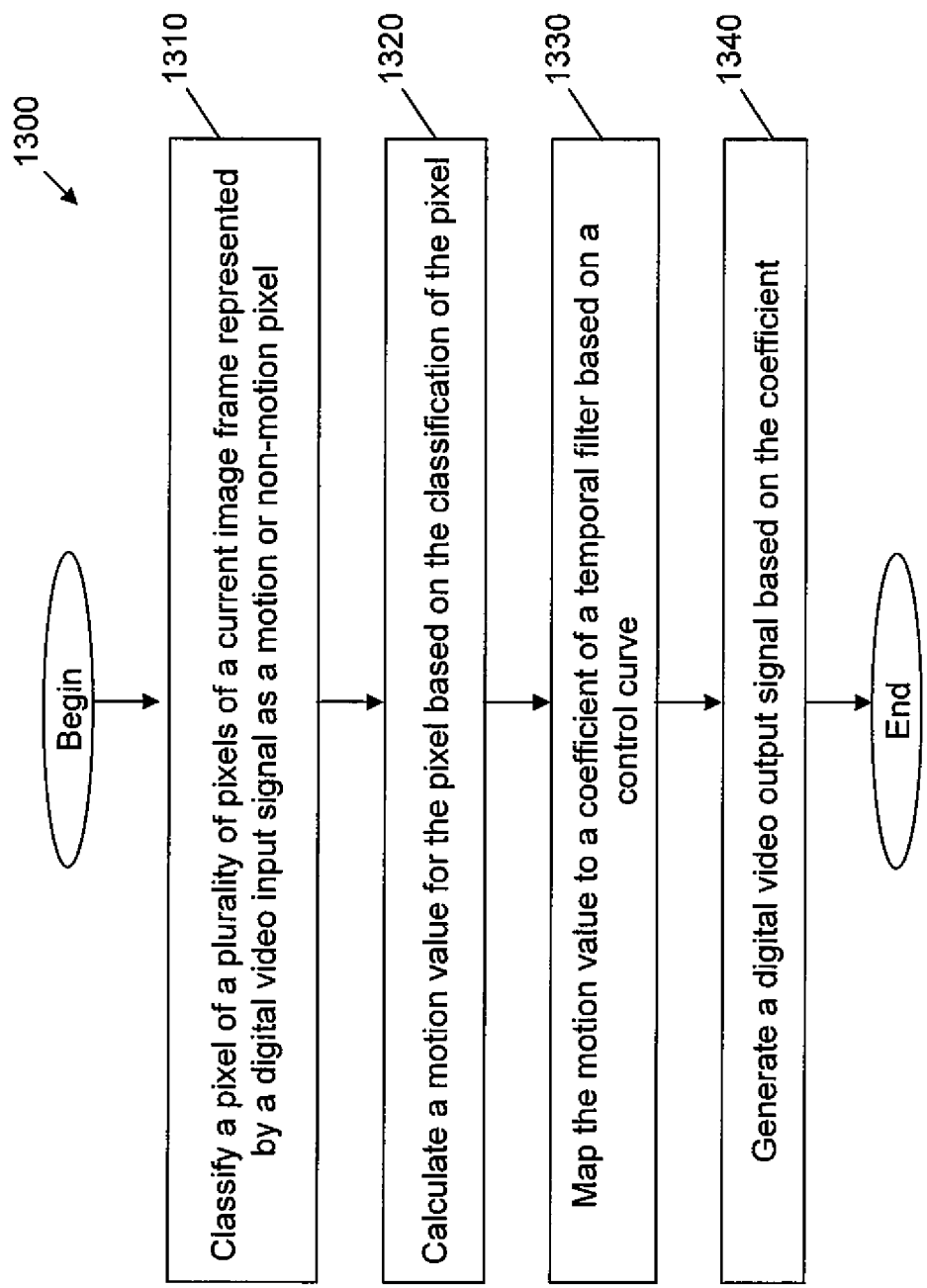
FIG. 13 is a flow chart of a process of motion detection in a sequence of digital images according to one embodiment.

FIG. 13 illustrates a process 1300 of motion detection in a sequence of video images according to one embodiment.

At 1310, a pixel of a plurality of pixels of a current image frame represented by a digital video input signal is classified to be a motion or non-motion pixel. At 1320, a motion value for the pixel is calculated based on the classification of the pixel. At 1330, the calculated motion value is mapped to a coefficient of a temporal filter based on a control curve. At 1340, a digital video output signal is generated based on the coefficient.

In one embodiment, when classifying the pixel to be a motion or non-motion pixel includes performing thresholding and spatial connectivity checking for the pixel. In one embodiment, performing thresholding includes performing signed or unsigned thresholding using an edge and texture adaptive threshold provided by an adaptive threshold calculator, such as the adaptive threshold calculator 104 of FIG. 1. In another embodiment, performing signed or unsigned thresholding using an edge and texture adaptive threshold provided by an adaptive threshold calculator includes performing signed or unsigned thresholding using analyzed edge and texture statistics information in a block of surrounding pixels or a coded DCT block of pixels. In yet another embodiment, performing thresholding includes calculating a signed or unsigned pixel difference value between a filtered previous frame and the current frame, and comparing the signed or unsigned pixel difference value against a respective signed or unsigned motion threshold.

In one embodiment, performing thresholding using an edge and texture adaptive threshold provided by an adaptive threshold calculator includes: analyzing edge and texture statistics information in a block of surrounding pixels or a DCT block of pixels; calculating a relative edge value of a pixel, the relative edge being a detected edge gradient normalized by a maximum edge gradient over the block of surrounding pixels; and mapping the relative edge value of the pixel to a motion threshold according to a mapping curve. In another embodiment, mapping the relative edge value of the pixel to a motion threshold according to a mapping curve includes: setting motion threshold values to be high for pixels with low relative edge values; setting the motion threshold values to be low for pixels with high relative edge values; adjusting the motion threshold values for flat area pixels or texture area pixels having low relative edge values based on a strength of a dominant edge and an average texture level in the block of surrounding pixels; and adjusting the motion threshold values for dominant edge pixels based on an estimated picture noise level.

In one embodiment, performing spatial connectivity checking for the pixel of the plurality of pixels of the image includes: counting a number of pixels in adjacent two rows and adjacent two columns each as having a respective absolute value of a respective positive, negative or absolute pixel difference exceeding a positive, negative or absolute motion threshold, respectively; and comparing the number of count to a predetermined count threshold to check the connectivity to determine if the pixel is a motion or non-motion pixel.

In one embodiment, calculating a motion value for the pixel based on the classification of the pixel includes calculating the motion value for the pixel using an absolute pixel difference value and a suppressed motion value based on respective luminance and chrominance components of a filtered previous frame and the current frame. In another embodiment, calculating a motion value for the pixel based on the classification of the pixel includes selecting an absolute pixel difference for motion classified pixel, and selecting a suppressed motion value for a non-motion classified pixel.

Thus, embodiments of an apparatus and method for detecting motion based on both the luminance and chrominance pixel values of the filtered previous frame and the current frame to provide the motion value for controlling the strength of the temporal noise reduction filter have been described. The motion classifier 106 classifies a pixel to be motion or non-motion, based on thresholding and spatial connectivity checking, to ensure noise robustness. The motion classifier 106 makes use of the pixel difference information computed based on both luminance and chrominance differences of the filtered previous frame and the current frame. The pixel difference information for each pixel is then sent to the motion classifier to check if a certain number of spatially connected pixels in a processing window have respective difference values above certain threshold. Depending on the thresholding and the spatial connectivity checking, the pixel will be classified as a motion or non-motion pixel.

To facilitate the edge and texture protection and further improve the robustness against mosquito noise, especially high magnitude mosquito noise, the edge and texture adaptive threshold calculator 104 decides the adaptive threshold value for the classification of each pixel. The edge and texture analyzer 103 analyzes the statistics of the edge and texture information in a coded DCT block, and such information is provided to the adaptive threshold calculation. For random noise reduction, the threshold value is adaptive to an estimated picture noise level and no edge or texture analysis is actually required.

The motion value calculator 108 outputs the discriminated motion values for motion and non-motion pixels. The noise cancellation filter 107 suppresses the motion values at stationary area for more effective temporal noise reduction at such area. For motion pixels, the motion value calculator 108 outputs the pixel difference information or an enhanced one, based on both luminance and chrominance differences of two frames. The control curve mapping unit 109 uses the detected motion value for mapping to control the strength of the temporal noise reduction filter. The control curve is derived and tuned for the prevention of the tail and blurring artifacts.

The disclosed motion detector 200 supports non-resized images as well as resized images, which have corresponding resized noise, by having different processing windows and different thresholds for resized and non-resized images.

It will be appreciated by those ordinarily skilled in the art that the disclosed embodiments are specially catered for mosquito noise, especially those with high magnitude, while paying special attention to protect the edges and textures of the image by incorporating the edge and texture analysis, which is unseen in any of the prior art.

In the above description, certain specific details are set forth in order to provide a thorough understanding of various disclosed embodiments.

Embodiments of the invention may be practiced without one or more of these specific details, or with other methods, components, materials, etc. Some well-known structures associated with integrated circuits have not been shown or described in detail since they are within the knowledge of one of ordinary skill in the art.

Unless the context requires otherwise, throughout the specification and claims which follow, the word "comprise" and variations thereof, such as "comprises" and "comprising," are to be construed in an open, inclusive sense, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The above description of illustrated embodiments, including what is described in the Abstract, is not intended to be exhaustive or to limit the various embodiments to the precise forms disclosed. Although specific embodiments of and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. An apparatus for temporal mosquito noise reduction in digital imaging, comprising:
    a motion detector coupled to receive a first video input signal and a second video input signal,
    the motion detector configured to classify a pixel of a plurality of pixels of a current frame of an image as a motion or non-motion pixel based on the received first and second video input signals,
    the classification including generation of a gradient magnitude of the pixel and generation of at least one gradient magnitude of a plurality of nearby pixels,
    the motion detector configured to calculate a motion value for the pixel based on the classification of the pixel, and
    the motion detector configured to generate a coefficient;
    a temporal filter coupled to receive the coefficient from the motion detector to generate a video output signal; and
    a frame delay unit coupled to receive the video output signal from the temporal filter to delay the video output signal and generate the second video input signal.

2. The apparatus of claim 1, wherein the motion detector comprises:
    an edge and texture analyzer coupled to receive the first video signal and the second video signal to output a gradient magnitude of a current pixel,
    a maximum gradient magnitude of a block of surrounding pixels or a discrete cosine transformed (DCT) block of pixels,
    and an average gradient magnitude of the block of surrounding pixels or the DCT block of pixels;
    an adaptive threshold calculator coupled to receive the gradient magnitude of the current pixel, the maximum gradient magnitude of the block of surrounding pixels or the DCT block of pixels,
    and the average gradient magnitude of the block of surrounding pixels or the DCT block of pixels to output a pixel-based motion threshold;
    a pixel difference calculator coupled to receive the first and second video signals to output a difference of the first and second video signals;
    a motion classifier coupled to receive the pixel-based motion threshold and the difference of the first and second video signals to output a pixel-based motion classification value;
    a noise cancellation filter coupled to receive the first and second video signals to output a suppressed motion value;
    a motion value calculator coupled to receive the difference of the first and second video signals, the pixel-based motion classification value, and the suppressed motion value to output a motion value of the pixel; and
    a control curve mapping unit coupled to receive the motion value of the pixel to output the coefficient to the temporal filter.

3. The apparatus of claim 2, wherein the edge and texture analyzer comprises:
    a first edge detector coupled to receive a luminance component of the first video signal to output a pixel gradient magnitude of a current frame;

a second edge detector coupled to receive a luminance component of the second video signal to output a pixel gradient magnitude of a filtered previous frame;

a maximum operator coupled to receive the pixel gradient magnitude of the current frame and the pixel gradient magnitude of the filtered previous frame to output the gradient magnitude of the current pixel representative of the greater of the current frame and the pixel gradient magnitude of the filtered previous frame;

a block memory buffer coupled to receive the gradient value to store and output pixel gradients of the block of surrounding pixels or the DCT block of pixels;

a maximum edge detector coupled to receive the pixel gradients of the block of surrounding pixels or the DCT block of pixels to output the maximum gradient magnitude of the block of surrounding pixels or the DCT block of pixels; and an average gradient calculator coupled to receive the pixel gradients of the block of surrounding pixels or the DCT block of pixels to output the average gradient magnitude of the block of surrounding pixels or the DCT block of pixels.

4. The apparatus of claim 2, wherein the adaptive threshold calculator comprises:

an adaptive threshold curve calculator coupled to receive a picture motion threshold and a relative gradient threshold to output the pixel-based motion threshold.

5. The apparatus of claim 4, wherein the adaptive threshold calculator further comprises:

a relative gradient calculator coupled to receive the gradient magnitude of the current pixel and the maximum gradient magnitude of the block or surrounding pixels or the DCT block of pixels to output a relative gradient related to a ratio of the gradient magnitude of the current pixel and the maximum gradient magnitude of the block or surrounding pixels or the DCT block of pixels, wherein the adaptive threshold curve calculator further receives the average gradient magnitude of the block or surrounding pixels or the DCT block of pixels, the relative gradient, and a rising factor of the motion threshold in addition to the picture motion threshold and the relative gradient threshold to output the pixel-based motion threshold.

6. The apparatus of claim 2, wherein the pixel difference calculator comprises:

a first subtractor coupled to receive and subtract a luminance component of the first video signal and a luminance component of the second video signal to output a first signed difference value;

a second subtractor coupled to receive and subtract a chrominance U component of the first video signal and a chrominance U component of the second video signal to output a second signed difference value;

a third subtractor coupled to receive and subtract a chrominance V component of the first video signal and a chrominance V component of the second video signal to output a third signed difference value;

a first absolute operator coupled to receive the first signed difference value to provide a first absolute difference value;

a second absolute operator coupled to receive the second signed difference value to provide a second absolute difference value;

a third absolute operator coupled to receive the third signed difference value to provide a third absolute difference value; and a comparison unit coupled to receive at least the first, second, and third signed difference values to output the difference of the first and second video signals.

7. The apparatus of claim 6, wherein the pixel difference calculator further comprises:

a first low pass filter coupled to receive the first absolute difference value in a window to provide a first filtered difference value of a center pixel;

a second low pass filter coupled to receive the second absolute difference value in the window to provide a second filtered difference value of the center pixel; and a third low pass filter coupled to receive the third absolute difference value in the window to provide a third filtered difference value of the center pixel, and wherein the comparator unit comprises: a comparator coupled to receive at least the first, second, and third filtered difference values to output a selection decision; and a switch coupled to receive at least the first, second, and third signed difference values and the selection decision to output the difference of the first and second video signals.

8. The apparatus of claim 2, wherein the noise cancellation filter comprises:

a first subtractor coupled to receive and subtract a luminance component of the second video signal from a luminance component of the first video signal to output a first signed difference value;

a second subtractor coupled to receive and subtract a chrominance U component of the second video signal from a chrominance U component of the first video signal to output a second signed difference value;

a third subtractor coupled to receive and subtract a chrominance V component of the second video signal from a chrominance V component of the first video signal to output a third signed difference value;

a first low pass filter coupled to receive and filter the first signed difference values in a window to output a first signed suppressed difference value of a center pixel;

a second low pass filter coupled to receive and filter the second signed difference values in a window to output a second signed suppressed difference value of the center pixel;

a third low pass filter coupled to receive and filter the third signed difference values in a window to output a third signed suppressed difference value of the center pixel;

a first absolute operator coupled to receive the first signed suppressed difference value to provide a first absolute suppressed difference value;

a second absolute operator coupled to receive the second signed suppressed difference value to provide a second absolute suppressed difference value;

a third absolute operator coupled to receive the third signed suppressed difference value to provide a third absolute suppressed difference value; and a comparison unit coupled to receive and compare at least the first, second, and third absolute suppressed difference values to output one of the received first, second, and third absolute suppressed difference values having a maximum magnitude as a suppressed difference of the first and second video signals.

9. The apparatus of claim 2, wherein the motion value calculator comprises:

an absolute operator coupled to receive difference of the first and second video signals to output an absolute value of the difference of the first and second video signals; and a switch coupled to receive a motion classification decision, the suppressed motion value and a value related to the absolute value of the difference of the first and second video signals to output a value related to the motion value of the pixel based on the motion classification decision.

10. The apparatus of claim 2, wherein the motion value calculator further comprises:
a motion value enhancer coupled to receive an absolute value of a difference of the first and second video signals to output an enhanced difference value of the first and second video signals; and
a low pass filter coupled to receive a motion value of the pixel based on the motion classification decision to output a post-processed value related to the motion value of the pixel.

11. A digital image noise reduction device, comprising:
a filter unit coupled to receive a video input signal and a delayed video signal to output a filtered video output signal, the filter unit including:
a motion detector, the motion detector configured to generate a pixel motion value based on a gradient magnitude of a current pixel and at least one gradient magnitude of each of a plurality of nearby pixels, the motion detector;
a control curve mapping unit configured to map the generated pixel motion value and supply a coefficient;
a temporal filter unit, the temporal filter unit configured to apply the coefficient and produced an interim filtered video output signal;
a spatial filter unit coupled to the temporal filter unit configured to produce the filtered video output signal; and
a frame delay unit coupled to receive the filtered video output signal and to output the delayed video signal.

12. The device of claim 11, wherein the filter unit further comprises:
a noise level estimator coupled to receive the video input signal to output a picture noise level to the motion detector.

13. An edge and texture analysis device, comprising:
a first temporal filter unit coupled to receive a signal related to a video input signal to output a first temporally filtered signal, the first temporal filter unit including:
a first frame delay unit coupled to receive the signal related to the video input signal to output a delayed video input signal; and
a first motion detector and temporal filter unit coupled to receive the video input signal and the delayed video input signal to output the first temporally filtered signal;
a second temporal filter unit coupled to receive a signal related to the first temporally filtered signal to output a second temporally filtered signal, the second temporal filter unit including:
a second frame delay unit coupled to receive a video output signal to output a delayed video output signal; and
a second motion detector, gradient magnitude calculator, and temporal filter unit coupled to receive the delayed video output signal and the signal related to the first temporally filtered signal to output the second temporally filtered signal, the gradient magnitude calculator configured to generate a gradient magnitude of a first pixel and generate at least one gradient magnitude of a plurality of nearby pixels; and
a spatial filter coupled to receive a signal to output a spatially filtered signal, the spatial filter being coupled between the video input signal and first temporal filter unit, between the first temporal filter unit and the second temporal filter unit, or between an output of the second motion detector and temporal filter unit and an input of the second frame delay unit.

14. A device to reduce mosquito noise effects in a digital image sequence, comprising:
a motion detector coupled to receive a first video input signal and a second video input signal, the motion detector to:
classify a pixel of a plurality of pixels of a current frame of an image as a motion pixel or a non-motion pixel based on the received first and second video input signals and based on a gradient magnitude calculation of the pixel and a gradient magnitude calculation of a plurality of nearby pixels;
calculate a motion value for the pixel based on the classification of the pixel; and
generate a coefficient from the motion value, the coefficient based on a control curve; and
a temporal filter coupled to receive the coefficient from the motion detector, the temporal filter to generate a video output signal based on the coefficient.

15. The device of claim 14 wherein
the motion detector includes an edge and texture analyzer, the edge and texture analyzer to:
analyze edge and texture statistics information in a block of surrounding pixels or a discrete cosine transformed (DCT) block of pixels;
calculate a relative edge value of the pixel, the relative edge being a detected edge gradient normalized by a maximum edge gradient over the block of surrounding pixels; and
map the relative edge value of the pixel to a motion threshold according to a mapping curve.

16. The device of claim 15 wherein
the edge and texture analyzer to map the relative edge value of the pixel to the motion threshold according to the mapping curve is to:
set motion threshold values to be high for pixels with low relative edge values;
set the motion threshold values to be low for pixels with high relative edge values;
adjust the motion threshold values for flat area pixels or texture area pixels having low relative edge values based on a strength of a dominant edge and an average texture level in the block of surrounding pixels; and
adjust the motion threshold values for dominant edge pixels based on an estimated picture noise level.

17. The device of claim 14 wherein
the motion detector includes a pixel difference calculator coupled to receive the first and second video signals and to output a difference of the first and second video signals.

18. The device of claim 14, comprising: a frame delay unit coupled to:
receive the video output signal from the temporal filter; and
delay the video output signal and generate the second video input signal.

19. The device of claim 14 wherein
the motion detector includes a noise cancellation filter coupled to receive the first and second video signals to output a suppressed motion value.

* * * * *